United States Patent
Hovor et al.

(10) Patent No.: US 9,716,721 B2
(45) Date of Patent: Jul. 25, 2017

(54) UNSTRUCTURED SECURITY THREAT INFORMATION ANALYSIS

(71) Applicant: Accenture Global Services Limited, Dublin (IE)

(72) Inventors: Elvis Hovor, Clarksburg, MD (US);
Shimon Modi, Washington, DC (US);
Shubhashis Sengupta, Karnataka (IN);
Roshni Ramesh Ramnani, Karnataka (IN); Annervaz Karukapadath Mohamedrasheed, Kerala (IN)

(73) Assignee: Accenture Global Services Limited, Dublin (IE)

( * ) Notice: Subject to any disclaimer, the term of this patent is extended or adjusted under 35 U.S.C. 154(b) by 128 days.

(21) Appl. No.: 14/473,743

(22) Filed: Aug. 29, 2014

(65) Prior Publication Data
US 2016/0065599 A1 Mar. 3, 2016

(51) Int. Cl.
| | |
|---|---|
| *G06F 17/30* | (2006.01) |
| *H04L 29/06* | (2006.01) |
| *G06F 21/55* | (2013.01) |
| *H04L 29/08* | (2006.01) |

(52) U.S. Cl.
CPC .......... *H04L 63/1416* (2013.01); *G06F 21/55* (2013.01); *H04L 63/14* (2013.01); *H04L 67/10* (2013.01)

(58) Field of Classification Search
None
See application file for complete search history.

(56) References Cited

U.S. PATENT DOCUMENTS

| | | |
|---|---|---|
| 6,173,284 B1 | 1/2001 | Brown |
| 6,704,874 B1 | 3/2004 | Porras |
| 7,203,693 B2 | 4/2007 | Carlbom et al. |
| 7,523,137 B2 | 4/2009 | Kass et al. |

(Continued)

FOREIGN PATENT DOCUMENTS

| | | |
|---|---|---|
| EP | 2 051 468 | 10/2012 |
| EP | 2770688 | 8/2014 |

(Continued)

OTHER PUBLICATIONS

"Common Vulnerability Scoring System (CVSS)" wikipedia.org [online] retrieved on Jul. 15, 2015. Retrieved from the Internet: <URL: https://en.wikipedia.org/wiki/CVSS>, 8 pages.

(Continued)

*Primary Examiner* — Hung Q Pham
(74) *Attorney, Agent, or Firm* — Fish & Richardson P.C.

(57) ABSTRACT

Methods, systems, and apparatus, including computer programs encoded on computer storage media, for creating structured data using data received from unstructured textual data sources. One of the methods includes receiving unstructured textual data, identifying one or more keywords in the unstructured textual data, determining one or more patterns included in the unstructured textual data using the identified keywords, identifying one or more intelligence types that correspond with the unstructured textual data using the determined patterns, and associating, for each of the identified intelligence types, a data subset from the unstructured textual data with the respective intelligence type.

21 Claims, 7 Drawing Sheets

(56) References Cited

U.S. PATENT DOCUMENTS

| | | | |
|---|---|---|---|
| 8,024,795 B2 | 9/2011 | Newton | |
| 8,463,790 B1* | 6/2013 | Joshi | G06F 17/30011 |
| | | | 707/738 |
| 8,504,879 B2 | 8/2013 | Poletto et al. | |
| 8,516,104 B1 | 8/2013 | Liu et al. | |
| 8,538,911 B2 | 9/2013 | Kass et al. | |
| 8,966,639 B1 | 2/2015 | Roytman et al. | |
| 8,984,643 B1 | 3/2015 | Krisher et al. | |
| 9,118,617 B1* | 8/2015 | Giroux | G06F 21/62 |
| 9,407,645 B2 | 8/2016 | Modi et al. | |
| 9,503,467 B2 | 11/2016 | Lefebvre et al. | |
| 2002/0078381 A1 | 6/2002 | Farley | |
| 2003/0033318 A1 | 2/2003 | Carlbom et al. | |
| 2003/0093514 A1 | 5/2003 | Valdes et al. | |
| 2003/0182310 A1 | 9/2003 | Charnock et al. | |
| 2004/0024738 A1 | 2/2004 | Yamane | |
| 2005/0071445 A1 | 3/2005 | Siorek | |
| 2005/0114493 A1 | 5/2005 | Mandato et al. | |
| 2005/0138413 A1 | 6/2005 | Lippmann et al. | |
| 2005/0185823 A1 | 8/2005 | Brown et al. | |
| 2006/0230071 A1 | 10/2006 | Kass et al. | |
| 2007/0067848 A1 | 3/2007 | Gustave et al. | |
| 2008/0005796 A1 | 1/2008 | Godwood | |
| 2008/0109730 A1 | 5/2008 | Coffman et al. | |
| 2008/0295172 A1 | 11/2008 | Bohacek | |
| 2008/0307525 A1 | 12/2008 | Nickle | |
| 2009/0219154 A1 | 9/2009 | Kukula | |
| 2010/0071061 A1 | 3/2010 | Crovella et al. | |
| 2010/0180344 A1 | 7/2010 | Malyshev | |
| 2010/0223499 A1 | 9/2010 | Panigrahy | |
| 2011/0185421 A1 | 7/2011 | Wittenstein | |
| 2011/0185422 A1 | 7/2011 | Khayam | |
| 2012/0096549 A1 | 4/2012 | Amini et al. | |
| 2012/0123822 A1* | 5/2012 | Hnatio | G06Q 50/26 |
| | | | 705/7.28 |
| 2012/0173710 A1 | 7/2012 | Rodriguez | |
| 2012/0254088 A9 | 10/2012 | Kass et al. | |
| 2013/0019008 A1 | 1/2013 | Jorgenson | |
| 2013/0239177 A1 | 9/2013 | Sigurdson et al. | |
| 2013/0339341 A1* | 12/2013 | Fan | G06Q 10/02 |
| | | | 707/722 |
| 2014/0157405 A1 | 6/2014 | Joll | |
| 2014/0189873 A1 | 7/2014 | Elder et al. | |
| 2015/0341379 A1 | 11/2015 | Lefebvre et al. | |
| 2016/0065598 A1 | 3/2016 | Modi et al. | |
| 2016/0261640 A1 | 9/2016 | Modi et al. | |
| 2016/0352768 A1 | 12/2016 | Lefebvre et al. | |

FOREIGN PATENT DOCUMENTS

| | | |
|---|---|---|
| JP | 06250911 | 9/1994 |
| WO | WO 2005/107414 | 11/2005 |
| WO | WO 2005/111805 | 11/2005 |
| WO | WO 2011/095988 | 8/2011 |
| WO | WO 2013/014672 | 1/2013 |
| WO | WO 2013/109374 | 7/2013 |

OTHER PUBLICATIONS

"Common Vulnerability Scoring System v3.0: Specification Document," first.org [online]. Jun. 12, 2015 [retrieved on Jul. 15, 2015]. Retrieved from the Internet: <URL: https://www.first.org/cvss/cvss-v30-specification-v1.4.pdf>, 19 pages.
"Protect Your PEO," crowdstrike.com [online] retrieved on Jul. 15, 2015. Retrieved from the Internet: <URL: http://www.crowdstrike.com>, 2 pages.
Extended European Search Report in Application No. 15168872.8, dated Oct. 20, 2015, 6 pages.
Office action in AU Application No. 2015202706, issued Oct. 30, 2015, 3 pages.
U.S. Non-Final Office Action for U.S. Appl. No. 14/285,487 dated Oct. 7, 2015, 22 pages.
U.S. Non-Final Office Action for U.S. Appl. No. 14/473,730 dated Aug. 23, 2015, 29 pages.
Polepeddi, "Software Vulnerability Taxonomy Consolidation," Thesis, Jan. 5, 2005, 43 pages. Retreived from the Internet: URL: http://www.osti.gov/bridge/product.biblio.jsp?osti_id=15020074 [retrieved on Nov. 2, 2007].
Extended European Search Report in Application No. 15181400.1 dated Jan. 27, 2016, 7 pages.
Office action in AU Application No. 2015202706, issued Mar. 8, 2016, 2 pages.
Srinivasan et al, "A self-organized agent-based architecture for power-aware intrusion detection in wireless ad-hoc networks," Computing & Informatics, IEEE 2006, 6 pages.
Office Action in AU Application No. 2015213316, Issued May 6, 2016, 3 pages.
Office Action in AU Application No. 2015213391, Issued May 15, 2016, 3 pages.
Canadian first Examiner's Report for Application No. 2,602,564 dated Mar. 1, 2013, 2 pages.
European Patent Office dated Dec. 18, 2007 for co-pending European Patent Office Application No. 07253957.0, 8 pages.
European Patent Office dated Feb. 4, 2008 for co-pending European Patent Office Application No. 06 742 600.7, 3 pages.
PCT International Preliminary Report on Patentability for Application No. PCT/EP2006/003533 dated Oct. 18, 2007, 13 pages.
PCT Notification of Transmittal of the International Search Report and the Written Opinion for International Application No. PCT/EP2006/003533 dated Sep. 8, 2006, 18 pages.
U.S. Final Office Action for U.S. Appl. No. 11/387,173 dated Aug. 14, 2008, 16 pages.
U.S. Final Office Action for U.S. Appl. No. 12/405,026 dated Dec. 12, 2011, 21 pages.
U.S. Non-Final Office Action for U.S. Appl. No. 11/387,173 dated Feb. 22, 2008, 16 pages.
U.S. Non-Final Office Action for U.S. Appl. No. 12/405,026 dated May 4, 2011, 19 pages.
U.S. Notice of Allowance for U.S. Appl. No. 11/387,173 dated Dec. 12, 2008, 19 pages.
U.S. Notice of Allowance for U.S. Appl. No. 12/405,026 dated Apr. 25, 2012, 13 pages.
U.S. Notice of Allowance for U.S. Appl. No. 12/405,026 dated Jun. 12, 2013, 21 pages.
"KBMS-Prototype KRISYS usermanual overview" KBMS-Prototype KRISYS User Manual, Dec. 1992 (Dec. 1992), p. 1-94, XP002193794.
Accenture, Technology Labs, Discover What Your Customers Really Think, 2pp., Accenture 2005.
Allan et al.: "Taking Topic Detection From Evaluation to Practice" Proceedings of the 38th International Conference on System Sciences, Jan. 3, 2005 (Jan. 3, 2005), 10 pages, XP010762602.
Birnbaum et al., "Analogy, Intelligent IR, and Knowledge Integration for Intelligence Analysis" Ai Technologies for Homeland Security, Papers From the 2005 Aaai Spring Symposium, Mar. 21, 2005 (Mar. 21, 2005) XP002390865 Menlo Park, CA Retrieved from the Internet: URL:http://www.infolab.northwestern.edu/infolab/downloads/papers/paper10142.pdf> [retrieved on Jul. 19, 2006], 6 pages.
Bloglines, Create a Personal Bloglines Page Loaded with the Freshest News About the Things You Love, 1p., 2003.
Chung and Mcleod: "Dynamic Topic Mining from News stream Data" COOPIS/DOA/ODBASE 2003, [Online] 2003, pp. 653-670, XP002391208 Retrieved from the Internet:URL:http://www.springerlink.com/(zb2dxr55xIjuq5453e2bnj55)/app/home/contribution.asp?referrer=parent&backto=issue,42,95;journal,1127,3908;linkingpublicationresults, 1:10 5633,1> [retrieved on Jul. 19, 2006].
ClearforestText-Driven Business Intelligence, ClearForest Tagging & Extraction Platform, 2pp., 2006.
Genalytics Auto, List Management Solution, Genalytics, Auto: List Management Solution for Driving Successful Campaigns, 2pp., Genalytics, Inc., 2006.

(56) References Cited

OTHER PUBLICATIONS

Genalytics Data Sheet, Genalytics, Genalytics Knowledge Extract: Extract Meaning from Your Uninstructed, Data, 2pp., Genalytics, Inc. 2004.
Genalytics DB Extract, Advanced Data Extraction, Genalytics DB Extract: Advanced Data Extraction, Transformation and Scoring for Enterprise Data, Genalytics, Inc. 2006, 2 pages.
Genalytics Model, Leverage More Data, Create Better Models, 2pp., Genalytics, Inc., 2006.
Genalytics Prospect, Automated Analytics and Targeted Analytics and Targeted Lists, 2pp., Genalytics, Inc., 2006.
http://genalytics.com, Building Next Generation Predictive Models Using Genetic Algorithm-based Software, 14pp Genalytics, Inc. 2003.
Intelliseek, Brandpulse Products, BrandPulse 360™, 2pp. 1997-2006.
Intelliseek, Brandpulse Products, BrandPulse CRM™, 2pp., 1997-2006.
Intelliseek, Brandpulse Products, BrandPulse Internet™, 2pp., 1997-2006.
Intelliseek, Brandpulse Products, BrandPulse™ Direct, 2pp., 1997-2006.
Intelliseek, Brandpulse Products, BrandPulse™ Overview, 2pp., 1997-2006.
Inxight ThingFlnder® Advanced, Inxight ThingFinder Advanced with Custom Entity Extraction, ThingFinder Advanced Delivers New Extensibility for Inxight Extraction Solutions, 1p., 2006.
Inxight, Inxight SmartDiscovery® Analysis Adapters and Connectors, 2pp., Inxight Software Inc., 2005.
Liu Hugo et al: "ConceptNet—a practical commonsense reasoning tool-kit" Bt Technol J; Bt Technology Journal Oct. 2004, [Online] vol. 22, No. 4, Oct. 2004 (Oct. 2004), pp. 211-226, XP002391209. Retrieved from the Internet: URL:http://web.media.mit.edu/{push/Concept Net-BTTJ.pdf>[retrieved on Jul. 19, 2006].
Makkonen: "Investigations on Event Evolution in TDT" Citeseer, [Online] 2003, XP002391206. Retrieved From the Internet: URL:Http://Citeseer.Ist.Pst.Edu/706354.Htm l>[Retrieved on Jul. 19, 2006], 6 pages.
McCallum, Bow: A Toolkit for Statistical Language Modeling, Text Retrieval Classification and Clustering, 2pp., Sep. 12, 1998.
McCallum, Rainbow, 6pp., Sep. 30, 1998.
NLTK: The Natural Language Toolkit. Edward Loper and Steven Bird, Proceedings of the ACL Workshop on Effective Tools and Methodologies for Teaching Natural Language Processing and Computational Linguistics, Philadelphia, Association for Computational Linguistics, pp. 62-69. Jul. 2002.
NLTK: The Natural Language Toolkit. Steven Bird and Edward Loper. Proceedings of the ACL demonstration session, Barcelona, Association for Computational Linguistics, pp. 214-217. Jul. 2004.
NLTK-Lite: Efficient Scripting for Natural Language Processing. Steven Bird. Proceedings of the 4th International Conference on Natural Language Processing (ICON). pp. 11-18, Kanpur, India. New Delhi: Allied Publishers. Dec. 2005.
Nallapati et al: "Event threading within news topics" Proceedings of the Thirteenth Acm Conference on Information and Knowledge Management (CIKM), [Online] 2004, pp. 446-453, XP002390646. Retrieved from the Internet: URL:http://www.cs.umass.edu/{nmramesh/p425-nallapati .pdf [retrieved on Jul. 19, 2006].
Soderland, "Learning information extraction rules for semi-structured and free text "Machine Learning Kluwer Academic Publishers Netherlands, [Online] vol. 34, No. 1-3, Feb. 1999 (Feb. 1999), pp. 233-272, XP002391210, ISSN: 0885-6125. Retrieved from the Internet: URL:http://www.springerlink.com/media/f62clcrrlncvnj23recn/contributions/m/2/3/n/m23118197vg924t51.pdf> [retrieved on Jul. 19, 2006].
Taming the Analytic Data Monster: An Advanced Approach to Data Extraction and Transformation for Enterprise Analytics, pp. 1-12, Genalytics, Inc., 2004.
Technorati™, About Technorati, Currently Tracking 31 Million Sites and 2.2 Billion links, 1p., 2006.
www.genalytics.com. Data Sheet, Genalytics Phone, Genalytics Phone: Phone Append our Reverse Look Up to Validate or Target your Prospects, 1 p., Genaytics, Inc. 2005.
www.inxight.com. Inxight SmartDiscovery™ The Complete Solution for Enterprise Information Discovery, 4pp., 2005.
www.yahoo.com. Sign In, 1p. Yahoo! Inc., 2006.
Yang et al., "Learning approaches for detecting and tracking news events" IEEE Intelligent Systems, [Online] vol. 14, No. 4, 1999, pp. 32-43, XP002391207. Retrieved from the Internet: URL:http://ieeexplore.ieee.org/ie15/5254/17016/00784083.pdf?tp=&arnumber=784083&isnumber=17016> [retrieved on Jul. 19, 2006].
Barnum, "Standardizing cyber threat intelligence information with the structured threat information eXpression (STIX)," Version 1.1; Revision 1, MITRE, Feb. 2014, 22 pages.
"Structured Threat Information eXpression—STIX—A structured language for cyber threat intelligence information," MITRE, Accessible via https://stix.mitre.org, Jul. 2013, 2 pages.
U.S. Appl. No. 13/975,993, "Identifying and classifying non-functional requirements in text," filed Aug. 26, 2013, 56 pages.
Anonymous: "Characterizing Malware with MAEC and STIX," [Apr. 21, 2014]. Retrieved from: URL:http://stixproject.github.io/about/Characterizing_Malware_MAEC_and_STIX_v1.0.pdf [retrieved on Dec. 7, 2015] 8 pages.
Farnham et al., "Tools and Standards for Cyber Threat Intelligence Projects," SANs Institute InfoSec Ready Room, pp. 2-21 (Oct. 14, 2013).
Extended European Search Report in Application No. 15181386.2, dated Dec. 16, 2015, 10 pages.
U.S. Notice of Allowance for U.S. Appl. No. 14/285,487 dated Jun. 8, 2016, 14 pages.
U.S. Final Office Action for U.S. Appl. No. 14/285,487, dated Mar. 2, 2016, 24 pages.
U.S. Notice of Allowance for U.S. Appl. No. 14/473,730, dated Mar. 1, 2016, 9 pages.
Australian Office Action for Application No. 2016219666, dated Oct. 14, 2016, 6 pages.
European Extended Search Report for Application No. 16186243.8, dated Nov. 15, 2016, 5 pages.
Australian Office Action for Application No. 2016216520, dated Oct. 7, 2016, 4 pages.
Australian Office Action for Application No. 2015113316, dated Mar. 8, 2017, 5 pages.
U.S. Notice of Allowance for U.S. Appl. No. 15/155,328, dated Jan. 13, 2017, 18 pages.
Australian Office Action for Application No. 2016247167, dated Dec. 20, 2016, 6 pages.

* cited by examiner

UNSTRUCTURED SECURITY THREAT INFORMATION ANALYSIS

BACKGROUND

Organizations may use security threat information to make changes to their networks, e.g., in response to perceived or actual threats. For instance, an organization may learn about a software vulnerability and install a software update that removes the vulnerability or change network settings to prevent, or reduce the likelihood, of a malicious actor exploiting the vulnerability.

SUMMARY

In general, one innovative aspect of the subject matter described in this specification can be embodied in methods that include the actions of receiving unstructured textual data, identifying one or more keywords in the unstructured textual data, determining one or more patterns included in the unstructured textual data using the identified keywords, identifying one or more intelligence types that correspond with the unstructured textual data using the determined patterns, and associating, for each of the identified intelligence types, a data subset from the unstructured textual data with the respective intelligence type. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving unstructured textual data, parsing the unstructured textual data into a plurality of sections including a particular section, identifying one or more keywords in the particular section of the unstructured textual data, determining one or more patterns that match the particular section using the identified keywords, identifying one or more intelligence types that correspond with the particular section using the determined patterns, and associating, for each of the identified intelligence types, a data subset from the unstructured textual data, associated with the particular section, with the respective intelligence type. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving unstructured textual data, identifying one or more keywords in the unstructured textual data, determining one or more patterns included in the unstructured textual data using the identified keywords, identifying one or more intelligence types that correspond with the unstructured textual data using the determined patterns, associating, for each of the identified intelligence types, a data subset from the unstructured textual data with the respective intelligence type, determining a rule for a third party that indicates that the third party should receive data associated with a particular intelligence type, determining that at least one of the identified intelligence types includes the particular intelligence type, and providing, for each of the at least one of the identified intelligence types, the respective data subset to the third party. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Associating, for each of the identified intelligence types, the data subset from the unstructured textual data with the respective intelligence type may include storing, for each of the identified intelligence types, at least one new record, in a database, specific to the respective intelligence type that each includes information from the respective data subset. The unstructured may include an advisory. Receiving the unstructured textual data may include receiving the unstructured textual data from a government or a security source. Identifying the intelligence types that correspond with the unstructured textual data using the determined patterns may include determining one or more rules using the determined patterns, and identifying the intelligence types that correspond with the unstructured textual data using the determined rules.

In some implementations, the method may include determining a rule for a third party that indicates that the third party should receive data associated with a particular intelligence type, determining that at least one of the identified intelligence types includes the particular intelligence type, and providing, for each of the at least one of the identified intelligence types, the respective data subset to the third party. Providing, for each of the at least one of the identified intelligence types, the respective data subset to the third party may include providing, for each of the at least one of the identified intelligence types, instructions to the third party for presentation of the respective data subset. The method may include receiving a plurality of second unstructured textual datasets that each include information about a potential security threat, determining that a first subset of the second unstructured textual datasets includes information about the same threat as a second, different subset of the second unstructured textual datasets, discarding the first subset, and identifying, for each second unstructured textual dataset in the second subset, one or more keywords in the respective second unstructured textual dataset.

In some implementations, the method may include parsing the unstructured textual data into a plurality of sections including a particular section. Each of the plurality of sections may include a sentence or a paragraph. The data subset may include data representing the particular section.

In general, one innovative aspect of the subject matter described in this specification can be embodied in methods that include the actions of for each dataset from multiple datasets that each include information about potential security threats: identifying, by one or more computers, one or more respective intelligence types that each categorizes a subset of data in the respective dataset, and associating, for each of the identified intelligence types, each of the subsets of data, which are categorized by the respective intelligence type, with the respective intelligence type. The method includes the actions of determining, for each of the subsets, whether the respective subset does not include information about the same threat as a different subset, determining one or more rules for a third party that each indicate that the third party should receive data associated with particular types of potential security threats and priority information for the data, determining, for each of the potential security threats indicated in the rules, a group of the subsets that include information associated with the respective potential security threat, assigning, for each subset in each of the groups, a priority to the respective subset using the priority information, and providing the determined subsets to the third party using the respective priorities. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of for each dataset from multiple datasets that each include information about potential security threats: identifying, by at least one of the computers, one or more respective intelligence types that each categorizes a subset of data in the respective dataset, and associating, for each of the identified intelligence types, each of the subsets of data, which are categorized by the respective intelligence type, with the respective intelligence type. The method includes the actions of determining one or more rules for a third party that each indicate that the third party should receive data associated with particular types of potential security threats and priority information for the data, determining, for each of the potential security threats indicated in the rules, a group of the subsets that include information associated with the respective potential security threat, assigning, for each subset in each of the groups, a priority to the respective subset using the priority information, and providing the determined subsets to the third party using the respective priorities. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of for each dataset from multiple datasets that each include information about potential security threats: identifying one or more respective intelligence types that each categorizes a subset of data in the respective dataset, and associating, for each of the identified intelligence types, each of the subsets of data, which are categorized by the respective intelligence type, with the respective intelligence type. The method includes the actions of determining, for each of the subsets, whether the respective subset does not include information about the same threat as a different subset, determining, for a third party, a group of the subsets that include information requested by the third party, assigning, for each subset in the group, a priority to the respective subset using priority information for the third party, and providing the determined subsets to the third party using the respective priorities. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Providing the determined subsets to the third party using the respective priorities may include providing the determined subsets for presentation according to the respective priorities. The method may include receiving the datasets from one or more sources, and parsing each of the datasets into the subsets of data. Identifying the respective intelligence types that each categorize a subset of data in the respective dataset may include identifying the respective intelligence types that each categorize one of the parsed subsets. The method may include determining that a first subset from the subsets does not include information about the same threat as a different subset. Determining the group of the subsets that include information associated with the respective potential security threat may include determining a group that includes the first subset.

In some implementations, the method may include determining that a first subset from the subsets includes information about the same threat as a different subset. Determining the group of the subsets that include information associated with the respective potential security threat may include determining a group that does not include the first subset. The method may include determining that the first subset includes information with an older timestamp than the corresponding different subset. Determining the group that does not include the first subset may include determining the group that does not include the first subset in response to determining that the first subset includes information with the older timestamp than the corresponding different subset. The method may include determining that the first subset includes information from a less reputable source than the corresponding different subset. Determining the group that does not include the first subset may include determining the group that does not include the first subset in response to determining that the first subset includes information from a less reputable source than the corresponding different subset. The method may include determining that content in the first subset varies from the corresponding subset by more than a threshold amount.

In some implementations, the method may include determining that a first subset from the subsets includes information about the same threat as a different subset, and merging the first subset with the corresponding different subset. The method may include determining that the first subset varies from the corresponding different subset by less than a threshold amount. Merging the first subset with the corresponding different subset may include merging the first subset with the corresponding different subset in response to determining that the first subset varies from the corresponding different subset by less than the threshold amount. The method may include determining that a first subset from the subsets includes information about the same threat as a different subset, determining that the first subset varies from the corresponding different subset by more than a threshold amount, and linking the first subset with the corresponding different subset.

In some implementations, the priority information may include priority information for the potential security threats. Determining, for each of the potential security threats indicated in the rules, the group of the subsets that include information associated with the respective potential security threats may include determining, for one of the potential security threats that identifies a particular software application used by the third party, that each of the subsets in the groups of subsets include information about the particular software application. Determining, for each of the potential security threats indicated in the rules, the group of the subsets that include information associated with the respective potential security threats may include determining, for one of the potential security threats that identifies a particular hardware device used by the third party, that each of the subsets in the groups of subsets include information about the particular hardware device.

In some implementations, the method may include determining, for each of the subsets, whether the respective subset does not include information about the same threat as a different subset. Determining, for the third party, the group of the subsets that include information requested by the third party may include determining one or more rules for the third party that each indicate that the third party should receive data associated with particular types of potential security threats and the priority information for the data. Assigning, for each subset in the group, a priority to the respective subset using priority information for the third party may include assigning, for each subset in each of the groups, a priority to the respective subset using the priority information.

The subject matter described in this specification can be implemented in particular embodiments so as to realize one or more of the following advantages. In some implementations, when a system receives data from multiple sources and stores the data in data constructs, e.g., formatted according to a standardized representation, the system reduces duplicate data sent to third parties and reduces potential confusion about related threat intelligence. In some implementations, when a system formats data received from multiple sources in data constructs, the system may improve expressiveness when describing a certain threat actor, their activities, how they operate, and possible mitigation actions. In some implementations, a system automates the process of determining duplicates and applying appropriate resolution to address duplicate data. In some implementations, a system provides users with an automatic determination of relevance of data specific to their particular infrastructure, e.g., hardware, software, or both.

In some implementations, transforming and formatting data from unstructured textual data sources into a structured collection of data may increase the quantity of documents that may be analyzed by a system, the type of documents that can be analyzed, provide more accurate correlation of threat intelligence information from multiples sources, or any combination of two or more of these. In some implementations, a system might not lose data or data granularity when creating data constructs from unstructured or structured data. In some implementations, a system may provide clients with the higher priority data before lower priority data, e.g., as determined for each client.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Unstructured threat intelligence gathering may automate the process of analyzing threat information from unstructured data sources, such as security advisories, security alerts, security warnings, or blog sources, using natural language processing techniques. A system may parse unstructured data from security advisories provided by agencies like the Federal Bureau of Investigation, the Center for Internet Security or the Multi-State Information Sharing Analysis Center, or the United States Computer Emergency Readiness Team. The system may use natural language processing, such as the Apache OpenNLP library, and a machine learning library, such as Waikato Environment for Knowledge Analysis (Weka) or in the R programming language, to identify relevant threat information from these advisories and map the threat information to structured data constructs, e.g., that may be accepted by multiple different organizations.

Figure 1:
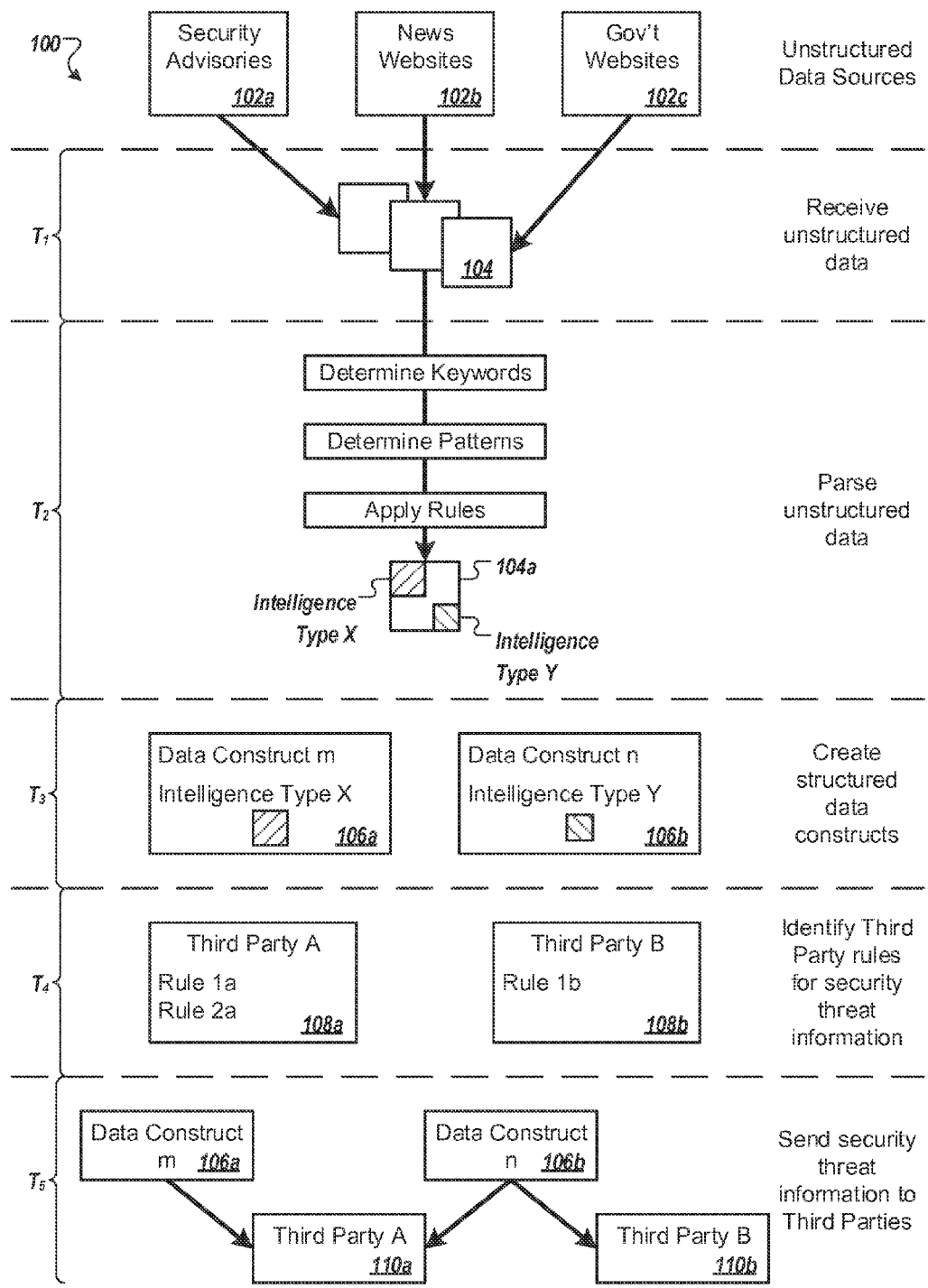
FIG. 1 is an example of an environment in which a system receives and parses unstructured data to create structured data constructs.

FIG. 1 is an example of an environment 100 in which a system receives and parses unstructured data 104 to create structured data constructs. The system may receive the unstructured data, e.g., unstructured textual data, 104 at time $T_1$ from multiple different unstructured data sources 102a-c, such as data included in a security advisory 102a, data from a news website 102b, or data from a government website 102c. The system may receive the unstructured data 104 from a news feed, in an alert, e.g., an email, or through any other appropriate method.

At time $T_2$, the system parses some of the unstructured data 104a. For instance, the system determines keywords, phrases, sentences, or any combination of two or more of these, in the unstructured data 104a. The system may determine patterns in the unstructured data 104a using the keywords, e.g., where each pattern corresponds with particular keywords or types of keywords and potentially locations of the keywords with respect to other keywords.

The system may use rules that correspond with the determined patterns to identify intelligence types that categorize all or parts of the unstructured data 104a. For example, the system may determine that co-occurrences of a set of keywords or a particular combination of keywords located within a sentence, adjacent sentences, or a paragraph, indicate that the text corresponds with a particular intelligence type, such as intelligence type X or intelligence type Y, each of which are associated with subsets of the unstructured data 104a.

Some examples of intelligence types may include i) observables, ii) indicators of compromise (IOC), iii) vulnerabilities, iv) exploits, v) adversary tactics, techniques, and procedures (TTP), vi) threat actors, vii) threat campaigns, and viii) courses of action (COA). Each of the intelligence types may have a corresponding data construct in the system, e.g., particular to the types of information available for or related to the respective intelligence type. For instance, the intelligence types may be formatted according to Structured Threat Information eXpression (STIX™).

Observables may be properties or measurable events pertinent to the operation of computers and networks. Some examples of observables may include information about a file, e.g., name, hash, or size; a registry key value; a service being started; or a Hypertext Transfer Protocol (HTTP) request being sent.

Indicators of compromise (IOC) may include certain observable conditions as well as contextual information about patterns of those observable conditions and how and when a pattern should be acted on. The contextual information may represent artifacts or behaviors of interest within a cyber-security context or both. The patterns of the observable conditions may be mapped to related TTP context information, include relevant metadata about confidence in the indicator's assertion, handling restrictions, valid time windows, likely impact, sightings of the information indicator, structured test mechanisms for detection, related campaigns, or suggested COA, or both related TTP context information and relevant metadata.

Vulnerabilities may include information about security vulnerabilities identified by independent research teams, internal teams, or security vendors. The security vulnerabilities may indicate particular vulnerabilities for an operating system, an application, or a version of an application, e.g., particular to a specific operating system.

Exploits may include information related to system vulnerabilities or the tools used to take advantage of a particular vulnerability by techniques of a threat actor. One example of exploit information may include identification or characterization of a vulnerability.

TTP may include information about how threat actors operate and perform their adversarial actions. An example tactic may include the use of malware to steal credit card credentials. An example technique may include sending emails to potential victims that include malicious attachments, e.g., used to capture credit card information. An example procedure may include research to identify potential targets for malicious email.

Threat actors may include characterizations of malicious actors that represent a cyber-threat and may include potential identity, location, specific techniques used by, presumed intent of and other observed historical behavior for the respective threat actor. Threat actors may be linked to TTPs, threat campaigns, or both, which were used by the respective threat actor or other threat actors that may be or are known to have been associated with the respective threat actor.

Threat campaigns may relate threat actors to particular IOC, exploits, TTP, or any combination of two or more of these. For instance, a threat campaign may indicate the particular procedures, and the indicators used to determine those procedures, used by a particular threat actor to compromise one or more organizations.

COA may include recommended actions to mitigate or remediate risks presented by IOC or motivation of threat actors or threat campaigns. For instance, a COA may be corrective, e.g., to fix an exploited vulnerability, or preventative, e.g., to fix a potential vulnerability or a vulnerability that has not yet been exploited, for the particular organization or another organization.

In some examples, some of the unstructured data 104a, e.g., a particular subset of the unstructured data 104a, may be associated with multiple intelligence types. For instance, a feed received from a first source may include a particular subset with information that can be categorized as a threat actor and as a threat campaign.

The system uses the identified intelligence types to create structured data constructs for the unstructured data 104a at time $T_3$. For example, the system determines data constructs specific to the respective intelligence types and stores data from the subsets of the unstructured data 104a in the respective data constructs. The system may store the subset that corresponds with the intelligence type X in a data construct m 106a, e.g., specific to the intelligence type X, and the subset that corresponds with the intelligence type Y in a data construct n 106b, e.g., specific to the intelligence type Y.

In some examples, the system determines whether some data for different intelligence types is related to the same threat, e.g., the same threat actor. The system may determine a relationship for the data that is related to the same threat and how that relationship should be identified, as described in more detail below. The system may determine relationships during time $T_1$, time $T_2$, time $T_3$, or a combination of two or more of these, depending on a configuration of the system and how the relationships are determined.

Once the data constructs are created, or for data that was previously placed in data constructs and not yet sent to a specific third party, at time $T_4$, the system identifies third party rules 108a-b for security threat information. The rules are particular to a specific third party. For example, Third Party A 110a may have rules 1a and 2a and Third Party B 110b may have rule 1b.

The rules for the different third parties may be the same or different. For instance, rule 1b may be the same as rule 2a, e.g., may identify the same types of intelligence types or the same subsets of intelligence types. These two rules may indicate that both third parties want to receive information about intelligence type Y, and the rule 1a may indicate that Third Party A would like to receive information about intelligence type X. In one example, a rule may indicate that the corresponding third party is interested in vulnerabilities for particular applications, operating systems, hardware, or two or more of these.

The rules may include a destination, e.g., a system address for the particular third party. In some examples, the rules do not include a destination, and the system determines a destination using the particular third party to which the rule corresponds. The destination may be an internet protocol (IP) address, a uniform resource identifier (URI), or another appropriate type of identifier for the third party or a system, e.g., computer, used by the third party. When two rules for different third parties are the same, e.g., identify the same types of threat intelligence data, the two rules may include different destinations that correspond with the respective third party.

At time $T_5$, the system sends data constructs, identified using the third party rules 108a-b, to the respective third parties 110a-b. For instance, the system sends the data construct m 106a to the Third Party A 110a and the data construct n 106b to both the Third Party A 110a and the Third Party B 110b. The data constructs provided to the third parties may be prioritized, e.g., using the third party rules 108a-b or other data, as described in more detail below.

One or more of the third parties 110a-b may use the data constructs 106a-b to adjust rules for an intrusion detection system (IDS), an intrusion prevention system (IPS), or both. For instance, The Third Party B 110b may receive courses of action from the system and update rules for an intrusion prevention system using the received courses of action. In one example, the Third Party B 110b may receive indicators of compromise, vulnerabilities, and exploits from the system, determine which of those threats are relevant to the Third Party B 110b, e.g., relevant to devices associated with the Third Party B 110b, and request courses of action from the system for the threats that are determined to be relevant to the Third Party B 110b. The Third Party B 110b may then use the received courses of action to update corresponding systems or policies, e.g., to prevent or reduce the likelihood of those threats occurring.

Some of the third parties 100a-b may analyze the data in the data constructs 106a-b, e.g., to determine historical perspectives, trends, or both. For instance, the Third Party A 110a may perform frequency analysis, determine clusters of threat relationships, or identify specific actors using the data constructs 106a-b.

In some examples, a third party may use received data constructs to determine potential tests for the third party's systems. For instance, the third party may test a potential vulnerability and determine how to manage the potential vulnerability.

In some implementations, a third party system may determine if one or more indicators, one or more observables, or a combination of the two, are currently occurring within the third party's infrastructure and, if so, perform an appropriate corrective action. In some implementations, a network resource manager, e.g., an IDS, may detect anomalous behavior, e.g., network behavior, and determine whether this behavior maps to indicators or observables received from the system. When the network resource manager determines that the behavior maps to data received from the system, the network resource manager may request additional information about the mapped indicators or observables from the system. For instance, the network resource manager may request and receive courses of action for the mapped indicators or observables, e.g., that the system identifies using relationships between the indicators or observables and the respective courses of action.

Figure 2:
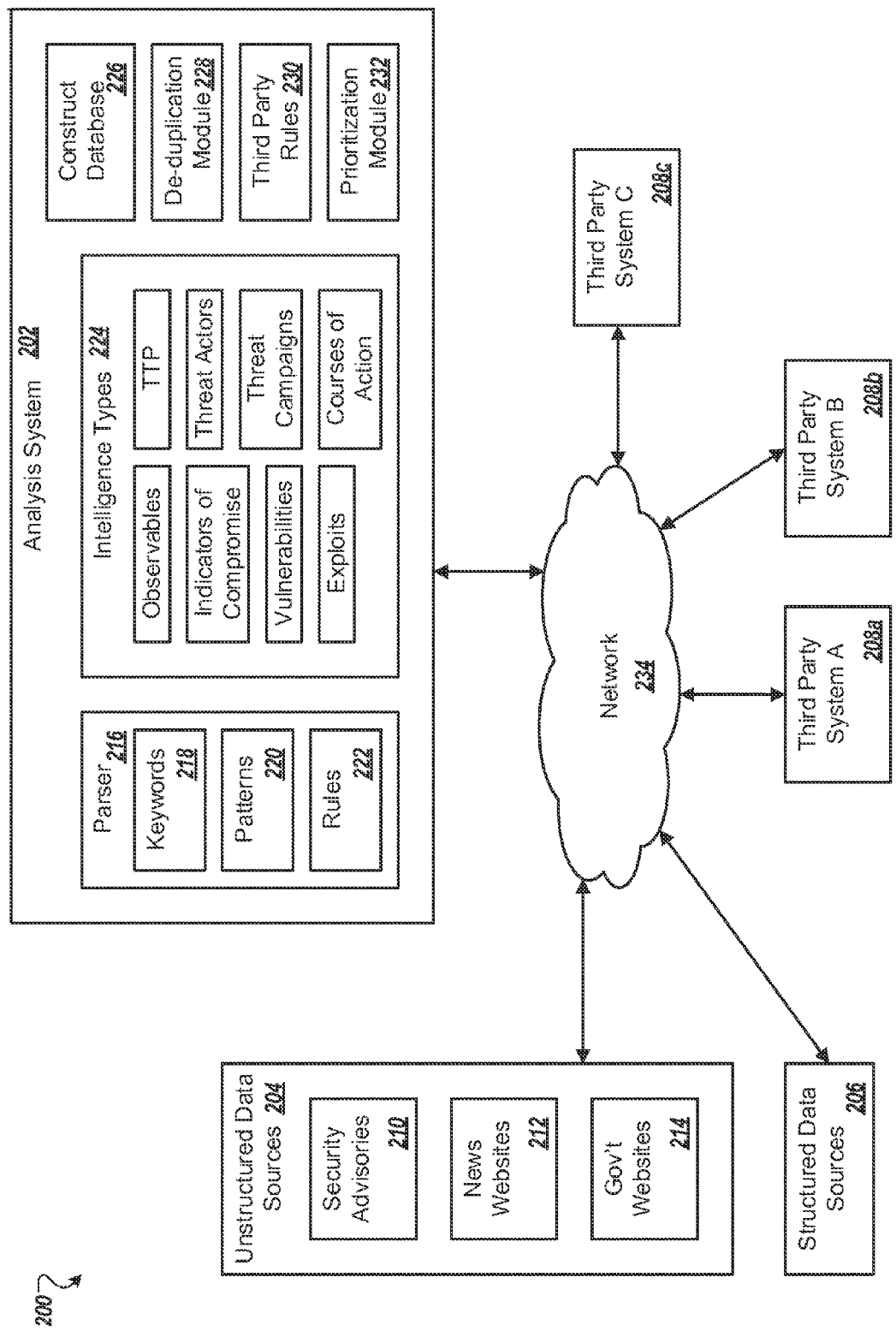
FIG. 2 is an example of an environment in which an analysis system receives data from unstructured data sources, parses the data, creates structured data constructs from the parsed data, and provides the structured data to third party systems.

FIG. 2 is an example of an environment 200 in which an analysis system 202 receives data from unstructured data sources 204, parses the data, creates structured data constructs from the parsed data, and provides the structured data to third party systems 208a-c. The analysis system 202 may also receive structured data from structured data sources 206, potentially merge or relate the structured data constructs created from the unstructured data with the structured data and provide the data, e.g., structured data or data from a combination of structured and unstructured data sources, to the third party systems 208a-c.

The unstructured data sources 204 may include security advisories 210 received by the analysis system 202, e.g., from unstructured data sources that distribute the security advisories via the Internet. The analysis system 202 may subscribe to one or more of the unstructured data sources 204 to receive some of the security advisories 210 from those sources. In some examples, the security advisories 210 may be publically available on a news website 212 or a government website 214.

The analysis system 202 may use a web crawler to scan documents referenced by specified uniform resource identifiers (URIs), e.g., for one or more of the unstructured data sources 204, to identify unstructured data. In some examples, the analysis system 202 may analyze a particular document, e.g., presented in a web browser or otherwise selected by a user, to determine unstructured data. For instance, a plugin in a web browser or another application may analyze content presented in the web browser and, upon identifying unstructured threat information, send that identified information to a server associated with the analysis system 202, e.g., that executes at least part of the analysis system 202.

The analysis system 202 may receive unstructured data, e.g., security threat information, from other types of news websites 212, such as a news publisher or a blog. The security threat information may include information about a known threat actor, e.g., a hacker group, that actor's activities, security breaches at an organization, vulnerabilities identified by one or more actors, e.g., a security organization, or any combination of two or more of these.

Some examples of content retrieved from the government websites 214 include security alerts, security warnings, or other information about security threats. The content from the government websites 214 may be publically available, e.g., on the Internet. The government websites 214 may include multiple different websites for the same government, for different governments, or both.

The unstructured data received from the unstructured data sources 204 does not include labels that explicitly identify intelligence types, e.g., threat actors, vulnerabilities, or exploits. As mentioned above, some examples of unstructured data include news websites, security alerts, blogs, and forum posts. The analysis system 202, as described in more detail below, may analyze the unstructured data to identify data that corresponds to intelligence types and store that data in structured data constructs as described in more detail below. The structured data from the structured data sources 206 is formatted according to a schema, e.g., specific to a particular one of the structured data sources 206. Some examples of structured data include an Extensible Markup Language (XML) feed, a feed with comma-separated values (CSV), or a tab delimited feed.

For instance, the structured data may include a header or title for threat information, may have a consistent way in which the data is stored in memory or presented, e.g., that is easily readable by computers, or both. The unstructured data does not have this consistency in data representation. Some examples of headers for structured data include "IP," "frequency," "percent of total," and "count" and the structured data would include values, e.g., text, numerical, or both, that correspond with each of these headers. In one example, unstructured data may include a blog post, which may include "section headers" that identify different portions of the post, e.g., "security threat A" and "security threat B," followed by the paragraphs of text describing those portions, but is not formatted in the same way as the structured data.

For instance, the structured data sources 206 may include multiple proprietary sources. Some examples of proprietary sources may include paid providers, to which the analysis system 202, or another system or party associated with the analysis system 202, provides compensation for data received by the analysis system 202, and government sources. For instance, a government agency may make threat information publically available to other systems, including the analysis system 202, upon request or may send the threat information to the analysis system 202 upon determining new threat information. The analysis system 202 may receive data from each of the proprietary sources in a proprietary format, e.g., in a data feed formatted specific to the particular proprietary source, or an open format.

The structured data sources 206 may include a threat exchange that provides data to the analysis system 202 for free. The threat exchange may require that the analysis system 202 provides the threat exchange with threat information in order to access threat information provided to the threat exchange by other sources. For instance, the threat exchange may receive data from one or more free content providers and provide that data to the analysis system 202, e.g., in exchange for data received from the analysis system 202 or not.

The analysis system 202 may receive open source data from some of the structured data sources 206. For example, the analysis system 202 may receive an Extensible Markup Language (XML) feed, a feed with comma-separated values (CSV), or a tab delimited feed.

One or more of the structured data sources 206 may overlap with other types of the structured data sources 206. For instance, one of the proprietary sources may provide an XML feed, a CSV feed, a tab delimited feed, or free threat information. In some examples, some of the proprietary sources may make data available on the threat exchange, e.g., for free or for a fee. Some of the open source data may be made available on the threat exchange.

A parser 216 in the analysis system 202 receives the unstructured data from the unstructured data sources 204 and uses keywords 218, patterns 220, and optionally rules 222, to create structured data constructs using data from the unstructured data, as described in more detail below. For example, the parser 216 may receive an unstructured dataset, and identify keywords in the dataset, e.g., that may be specific to particular intelligence types or particular types of attacks.

The parser 216 uses the identified keywords, and potentially the position of those keywords in the respective dataset, to determine text patterns from the patterns 220 that correspond to the respective dataset. For instance, the parser 216 may compare strings from the unstructured data, e.g., that include some of the identified keywords, with the patterns 220 to determine whether the string matches or is similar to one of the patterns 220.

The parser 216 may use the determined patterns 220 for the unstructured data or a subset of the unstructured data to determine intelligence types for the respective subset of the unstructured data. For instance, the rules 222 may indicate that a particular pattern or group of patterns is associated with a particular one or more of the intelligence types 224. The parser 216 may use any appropriate algorithm to determine which intelligence types 224 are associated with the unstructured data or a subset of the unstructured data. Some examples of the intelligence types 224 include observables, indicators of compromise (IOC), vulnerabilities, exploits, adversary tactics, techniques, and procedures (TTP), threat actors, threat campaigns, and courses of action (COA), described in more detail above.

The parser 216 may use machine learning, e.g., supervised or unsupervised, when processing unstructured data. For example, the parser 216 may use an OpenNLP library when processing the unstructured data.

For each of the intelligence types for a single dataset or subset of unstructured data, the parser 216 creates a data construct specific to the respective intelligence type and stores the data construct in a construct database 226. For example, the parser 216 may create a data construct for an observable, a threat campaign, a COA, a vulnerability, or an exploit that includes an identifier for the data construct and the subset of data from the unstructured data that corresponds with the intelligence type. In some examples, the data constructs may include an identifier for the source of the data, e.g., the particular unstructured data source 204 or structured data source 206 from which the analysis system 202 received the data, a timestamp, e.g., for when the corresponding data was generated by or received from the respective structured data source, a source reputation, a severity, a severity reputation, or a combination of two or more of these.

Some of the data constructs may include links to other data constructs. For instance, a data construct for an IOC may include one or more links to data constructs for corresponding observables and a threat actor data construct may include one or more links to threat campaigns or TTP used by the respective actor. Some of the data constructs, e.g., for IOC, threat actors, or TTP, may include a title or a name.

In some implementations, the parser 216 may create multiple data constructs for a particular intelligence type, e.g., from a single set of unstructured data. For instance, the parser 216 may determine a subset of a particular unstructured dataset that corresponds with observables and that different portions of that subset correspond with different instances of observables. One portion of the subset may include information about an HTTP request and another portion of the subset may include information about a particular file. In this example, the parser 216 creates a first observable data construct for information about the HTTP request and a second observable data construct for information about the particular file.

A de-duplication module 228, included in the analysis system 202, may determine relationships between datasets received from the unstructured data sources 204, parsed data, e.g., that has not yet been stored in the construct database 226, data received from the structured data sources 206, data constructs stored in the construct database 226, or any combination of two or more of these. For instance, the de-duplication module 228 may determine whether some of the data in two data constructs is related to the same threat, includes the same information about a threat, or includes information about related threats and how that information or those threats are related. The de-duplication module 228 may merge two different data constructs, relate two different data constructs, or discard one of two related data constructs.

For example, the de-duplication module 228 or the parser 216 may merge two sets or subsets of unstructured data when creating a data construct; discard some of the data, e.g., one of the subsets, and create a single data construct; or relate two separate data constructs, one of which may be newly created and the other previously created or both of which may be newly created. For instance, a data construct may include data subsets from both a first set of unstructured data and a second set of unstructured data, both of which correspond to the same intelligence type.

The parser 216 may work together with the de-duplication module 228 during a de-duplication process. For instance, the de-duplication module 228 may determine whether two data sets or subsets, e.g., of unstructured data, are related and how they are related, and the parser 216 may use information about the relationship when creating or updating data constructs stored in the construct database 226.

When multiple datasets, or subsets, are related to the same threat and include the same information, e.g., all of the same information, the analysis system 202 may discard the older datasets and keep the newest dataset for a construct. Similarly, when multiple subsets are related to the same threat and include most of the same information, e.g., the newest dataset includes more information or updated information, the analysis system 202 may discard the older datasets and keep the newest dataset. In some examples, when an IOC subset or data construct includes the same observables, or links to the data constructs for the same observables, as another IOC subset or data construct, the analysis system 202 determines that the two are related to the same threat.

In some implementations, the analysis system 202 may discard a dataset when two datasets are related to the same threat but the information included in the two datasets varies by more than a threshold amount, e.g., by more than a predetermined percentage or by a predetermined quantity, such as a quantity of words, phrases, sentences or paragraphs. The discarded dataset may be the older dataset or the dataset from a less reputable source.

For instance, the system may use historical analysis of information from a certain source to determine a reputation for that source, e.g., historical analysis of how actionable is the information from a certain source. In some examples, the system may determine how much data from source A overlaps with a known well-reputed source. If there is a high overlap between data from source A and the well-reputed source, the system may assign a high reputation to the source A. In one example, an analyst may dynamically assign a reputation score to a source. The analysis system 202 may use any appropriate method to determine a source's reputation.

When a subset or a data construct includes a confidence score, the element with the highest confidence score may be kept, e.g., and the other data discarded. The confidence score may represent a probability that the data in the data construct is accurate or a probability that the data in the data construct is from a reputable source, e.g., as determined by the analysis system 202. In some examples, the analysis system 202 may discard data with a lower confidence score when there is more than a twenty percent difference between the two confidence scores.

When multiple subsets of data are related to the same threat, e.g., determined using an identifier for the threat, the analysis system 202 may discard the subsets from the less reputable sources and keep the subsets from the more reputable sources. For instance, the analysis system 202 may create a data construct using the data from the more reputable sources. In some examples, if a cost, efficacy, affected software, confidence score, victim, time, leveraged TTPs, or attributed threat actors for a data construct or a subset, e.g., a COA, an exploits, or an incident data construct, are different than an existing data construct or another subset, the analysis system 202 may use the subset or data construct from the more reputable source, e.g., when each data construct includes a "source" element.

When multiple subsets of data are related to the same threat, but the content of the subsets is different, e.g., by more than a threshold amount, the analysis system 202 may create a data construct for each of the subsets and relate each of the created data constructs with each other. For instance, each data construct may include an identifier or one or more pointers that the analysis system 202 may use to determine the related data constructs, e.g., using a "related packages" element in the respective data construct.

In some examples, if a name in a subset of data is similar to a name in another subset of data, or in an existing data construct, e.g., when the names are used to identify the data, the analysis system 202 may relate a new data construct for the subset to a data construct for the other subset, or the existing data construct. The similarity in the name may allow for small errors, e.g., one character differences, and extensions of names, e.g., where "cat" and "cat_1" are considered matches.

The analysis system 202 uses third party rules 230 to determine when to send data constructs to the third parties 208a-c, what types of data constructs to send to the third parties 208a-c, and how to prioritize the data constructs, e.g., an order in which to present the data constructs to the third parties 208a-c or for the third parties 208a-c to present the information to a user. For instance, the analysis system 202 may determine to send data constructs to the third party system A 208a when relevant data constructs are created by the analysis system 202, to send data constructs to the third party system B 208b once each day, and to send data constructs to the third party system C 208c once each week. The third party rules 230 may include a particular time of day at which the analysis system 202 should send corresponding data constructs to the requesting third party systems 208a-c.

The analysis system 202, or a module of the analysis system 202, may use the third party rules 230 to determine which data constructs to send to each of the third party systems 208a-c. For instance, a first rule for the third party system A 208a may indicate that the third party A wants to receive threat information that is relevant to a particular organization or industry and a second rule for the third party system B 208b may indicate that the third party B wants to receive threat information for a particular operating system or a particular version of an operating system.

The third party rules 230 may include a corresponding destination for the requested data constructs. For instance, the first rule for the third party system A 208a may include an IP address for the third party system A 208a. In some examples, a rule may indicate that the analysis system 202 should send a first subset of data constructs to a first destination and a second subset of data constructs to a second destination. For instance, the third party system B 208b may include multiple servers and the analysis system 202 provides the first subset to a first server in the third party system B 208*b* and provides the second subset to a second server in the third party system B 208*b*.

A prioritization module 232, included in the analysis system 202, may use the third party rules 230 to determine a priority for each of the data constructs requested by a particular one of the third party systems 208*a-c*. For instance, after the analysis system 202 determines the data constructs to provide to the third party system C 208*c*, the prioritization module 232 determines the order in which the data constructs are provided to the third party system C 208*c* or presented on a user interface on the third party system C 208*c*, e.g., based on instructions provided by the analysis system 202 to the third party system C 208*c* for the presentation of the information included in the requested data constructs.

The prioritization module 232 may analyze how recently a threat, e.g., that is represented by a corresponding data construct, was used or identified, the severity of the threat, whether a government source has released a statement about the threat, or any combination of two or more of these when prioritizing the data constructs. For instance, the prioritization module 232 may assign a data construct for a newer threat a higher priority than another data construct for an older threat. The prioritization module 232 may assign a data construct for a more severe threat a higher priority than another data construct for a less severe threat, e.g., irrespective of the newness of either of the threats.

The prioritization module 232 may determine a severity of a threat using comments included in data from the unstructured data sources 204, from the structured data sources 206, or from other sources. For instance, the prioritization module 232 may assign a data construct a default, e.g., low or medium, severity unless the prioritization module 232 determines that comments that correspond with a threat represented by a data construct indicate that the threat should be associated with a different, e.g., higher, severity. The analysis system 202 may determine the comments or severity of a threat using unstructured data and details about a threat using structured data. In some examples, the analysis system 202 may determine the severity of a threat and the details of the threat from the unstructured data.

The third party systems 208*a-c* may use the received data constructs, and the priority in which the data constructs are received or identified for presentation, to take corresponding actions based on the threats identified in the data constructs. For instance, the third party system A 208*a* may be an automated system that determines whether the indicated threat is relevant to the third party A, e.g., whether or not any devices for the third party A may be affected by the indicated threat. Upon determining that a particular threat is relevant to the third party A. e.g., that a device may be compromised because of the indicated threat, the automated system may request a course of action (COA) from the analysis system 202 that corresponds with the particular threat. The third party system A 208*a* may analyze the data constructs in the order the data constructs are received from the analysis system 202, e.g., according to the priority of the data constructs. The analysis system 202 may provide data constructs to third party systems 208*a-c* using an application programming interface (API), a feed, e.g., XML or rich site summary (RSS), or any other appropriate type of method or protocol.

In some examples, the analysis system 202 provides instructions to one of the third party systems 208*a-c*, e.g., the third party system B 208*b*, for the presentation of a user interface that includes information about the requested data constructs and the threats indicated by those data constructs.

The user interface presents the threats according to the priority determined by the prioritization module 232, e.g., with higher priority threats presented before lower priority threats. When the third party system receives additional data constructs from the analysis system 202, the third party system may merge the most recently received data constructs, or information associated with these data constructs, with a current presentation of other previously received data constructs, or information associated with those data constructs. For instance, using the instructions received from the analysis system 202, the third party system may determine that a first newly received data construct has a higher priority than a currently presented data construct and present the first newly received data construct above the currently presented data construct in a user interface. A second newly received data construct may have a lower priority than, and be presented below, the currently presented data construct.

In these examples, a user may view the user interface and determine which of the threats are relevant to the third party C and which threats require a corresponding action to be taken. For instance, a device operated by the user may request additional information about a particular threat, such as a COA, from the analysis system 202, e.g., when an action should be taken for a threat. Upon receipt of the COA, the device operated by the user or another device, e.g., an automated device, may perform the action identified by the COA, e.g., to prevent or reduce the likelihood of the threat.

In some implementations, the prioritization module 232 may use learning to determine how to prioritize data constructs that will be sent to the third party systems 208*a-c*. For instance, the prioritization module 232 may receive requests for COAs from the third party system C 208*c*, determine that the types of threats associated with these COAs should have a higher priority than other types of threats for which the third party system C 208*c* requested information, and update corresponding third party rules, or a prioritization module for the third party C, to indicate which types of threats should have a higher priority.

The prioritization module 232 may use a list of hardware manufacturers, a list of device models, a list of software developers, a list of software versions, a list of firewall rules, a list of intrusion prevention system rules, a list of malware rules, information source data, whether a course of action was performed, e.g., by the respective third party system, whether a patch was applied, e.g., by the respective third party system, or any combination of two or more of these when determining a data construct priority for one of the third party systems 208*a-c*. The particular third party system 208*a-c* may include any combination of prioritization rules, and rules for data constructs of interest, when defining the corresponding third party rules 230.

In some examples, the prioritization module 232 may filter out data constructs for particular hardware manufacturers, device models, software developers, software versions or any combination of two or more of these, determined not to be relevant to a particular one of the third party systems 208*a-c*, e.g., and not send these data constructs to the particular third party system. The prioritization module 232 may filter out data constructs for particular data sources, e.g., when a third party rule indicates that data constructs from the particular data sources should not be sent to the corresponding third party system or when the third party system should only receive data constructs for data from a predetermined list of data sources that does not include any of the particular data sources.

In some implementations, the prioritization module 232 might not send any COAs to one or more of the third party systems 208*a-c*, e.g., unless one of the third party systems 208*a-c* requests a specific COA, at which time the analysis system 202 provides the respective third party system with the specific COA. In some examples, the prioritization module 232 determines whether a particular data construct relates to a malware signature, a firewall rule, or both, that has already been added to a corresponding firewall or anti-virus configuration. If so, the analysis system 202 might not send a corresponding data construct to the respective third party system. If not, the analysis system 202 sends the corresponding data structure to the respective third party system.

A network 234, such as a local area network (LAN), wide area network (WAN), the Internet, or a combination thereof, connects the analysis system 202, the unstructured data sources 204, the structured data sources 206, and the third party systems 208*a-c*. For instance, the analysis system 202 may receive structured data from the unstructured data sources 204 and the structured data sources 206 using the network 234 and provide data constructs to one or more of the third party systems 208*a-c* using the network 234.

Figure 3:
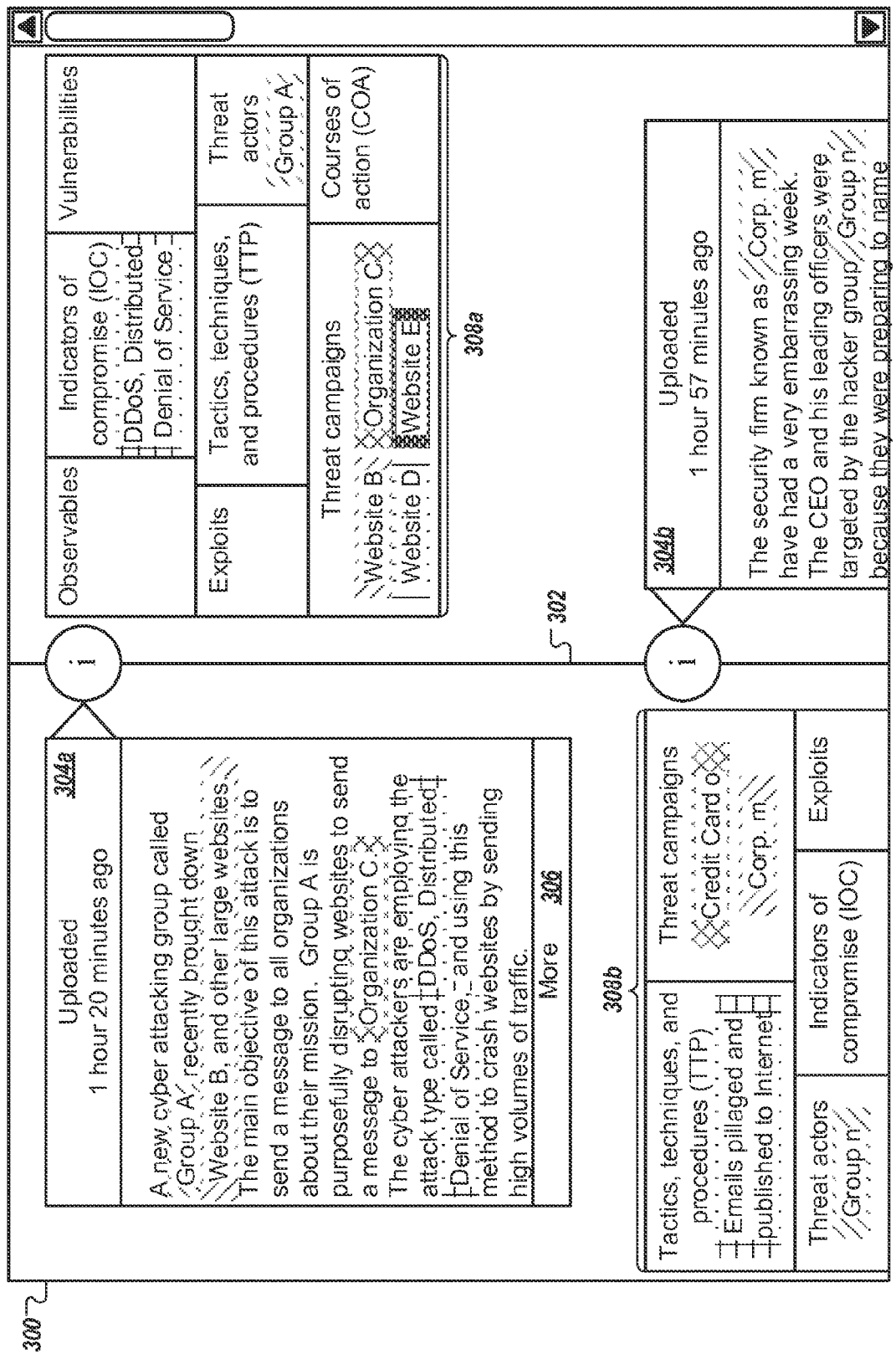
FIG. 3 is an example of a user interface for presenting security threat information.

FIG. 3 is an example of a user interface 300 for presenting security threat information. The user interface 300 includes a priority line 302 that indicates a priority of security threats presented in the user interface 300. For instance, instructions for the presentation of the user interface 300 may be provided to a particular third party system that include information about different security threats and corresponding priority information, e.g., specific to the particular third party system. If another third party system were to receive the same information about the same security threats, the other third party system may receive different priority information for those security threats, e.g., when the different priority information is specific to the other third party system.

In the example shown in FIG. 3, a first document 304*a*, presented above a second document 304*b*, has a higher priority than the second document 304*b*, e.g., and was determined to be potentially more relevant to the particular third party system. In other examples, the second document 304*b* may have a higher priority than the first document 304*a*.

The first document 304*a* includes information about a security threat, such as a note indicating that "a new cyber group called Group A recently brought down Website B, and other large websites" such as Website D and Website E. The first document 304*a* may further indicate that "the main objective of this attack is to send a message to all organizations about their mission. Group A is purposefully disrupting websites to send a message to Organization C. The cyber attackers are employing the attack type called DDoS, Distributed Denial of Service, and using this method to crash websites by sending high volumes of traffic."

The formatting of the first document 304*a* may correspond with the format of the unstructured data received by the analysis system. In some examples, the analysis system determines the formatting of the first document 304*a* using rules or style sheets, or another appropriate method.

A user of the particular third party system may view the first document 304*a* and determine whether the first document 304*a* includes information associated with the particular third party system. For instance, the user may determine whether the attack may be or is directed toward the particular third party system or another system operated by or associated with the third party, such as an organization with which the third party works or has a business relationship.

The user may select a more information option 306 in the user interface 300 to view additional details about the security threat or a list of options for the security threat. The list of options may include an option to view the intelligence types associated with the first document 304*a*. Upon selection of an option to view the intelligence types, the particular third party system may receive instructions from the analysis system for presentation of an intelligence types view 308*a* for the first document 304*a*. The intelligence types view 308*a* may indicate that the threat actors identified in the first document 304*a* include the Group A, the threat campaigns include the Website B, the Organization C, and the Websites D and E, e.g., the latter two as the other large websites mentioned in the note for the first document 304*a*. The intelligence types view 308*a* may include DDoS as an indicator of compromise for the first document 304*a*.

The user may select an option to receive a course of action for the first document, e.g., in the menu presented upon selection of the more information option 306 or in the intelligence types view 308*a*. Upon selection of the option to receive a course of action, the particular third party system may request, and receive, a corresponding course of action from the analysis system. For instance, the request may include an identifier for the first document 304*a*, or the threat campaigns or the threat actors identified in the first document 304*a*, or a combination of the two, and the analysis system may use this information to determine a corresponding course of action and provide information about the corresponding course of action to the particular third party system.

The particular third party system may present information about the course of action to the user, e.g., in the user interface 300 or another user interface. In some examples, the particular third party system may automatically perform one or more actions in response to receipt of the requested course of action, e.g., without user input. The actions performed by the particular third party system may reduce or eliminate the likelihood that the particular third party system, or another system associated with the particular third party, may be compromised by the same threat as the security threat identified in the first document 304*a*.

After viewing the first document 304*a*, the user may select a complete option to indicate that the user viewed the first document 304*a*, and view information about the second document 304*b*. For instance, the user may view an intelligence types view 308*b* for the second document 304*b*.

Figure 4:
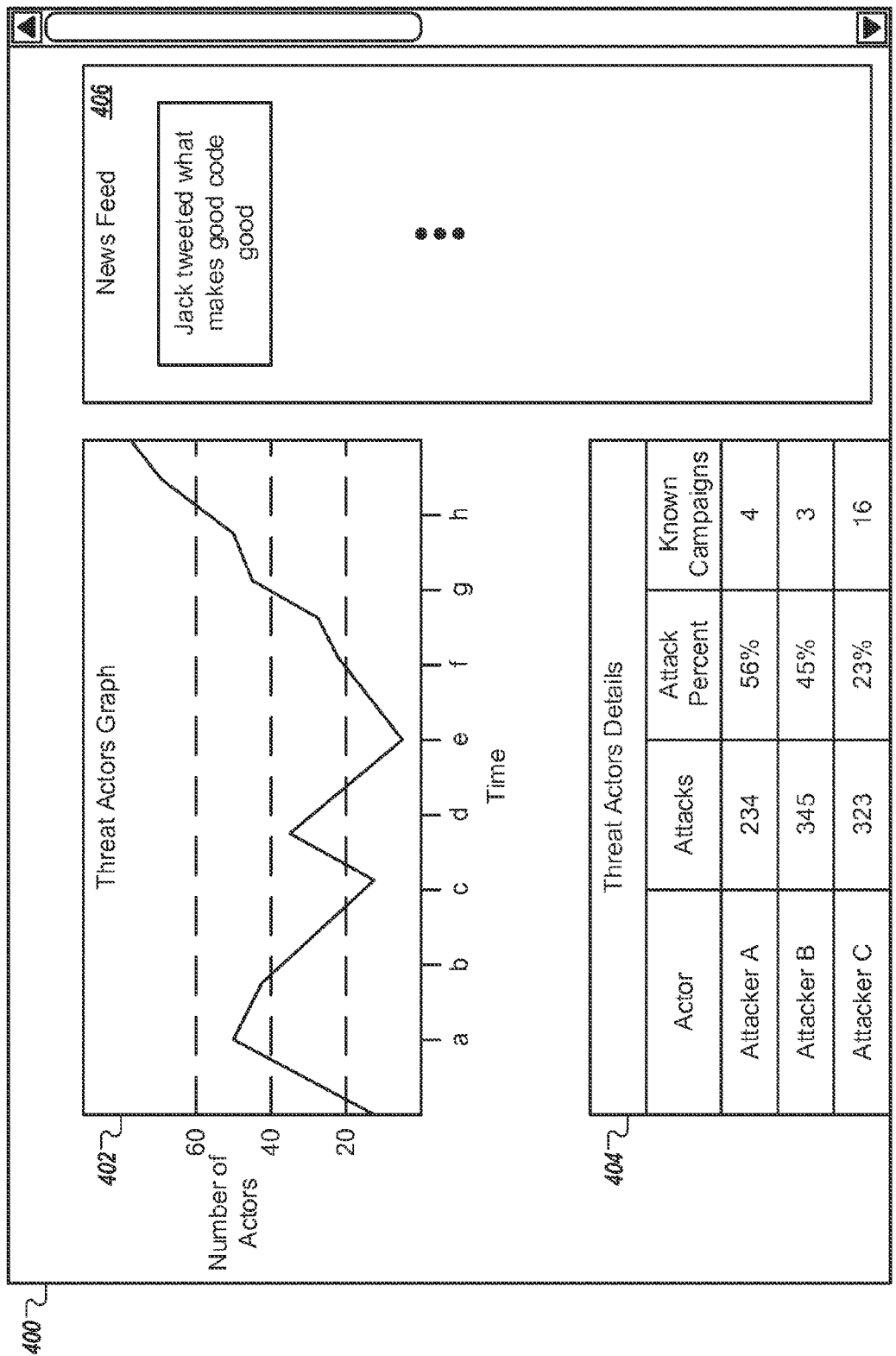
FIG. 4 is an example of a user interface that includes threat trend information.

FIG. 4 is an example of a user interface 400 that includes threat trend information. For instance, the analysis system may provide a third party system with security threat information and the third party system may use the received security threat information to generate the user interface 400. In some implementations, the analysis system may provide the third party system with instructions for the presentation of the user interface 400.

The user interface 400 includes a threat actors graph 402 with information about a quantity of threat actors over a particular period of time. The particular period of time may be the most recent year, month, week, or another time range, e.g., determined by a user of the user interface 400.

The quantity of threat actors may be specific to a particular industry, e.g., retail, a particular organization or entity, e.g., Company A, or for all known threat actors during the particular period of time. The quantity of threat actors may include only unique instances of threat actors or may include multiple instances of the same threat actor. For example, when a particular group attacks two different organizations using different techniques, the quantity of threat actors may count this particular group once, e.g., only unique instances of threat actors, or twice, e.g., for each attack performed by the particular group. In the latter example, the threat actors graph 402 may be a threat attacks graph that shows trends in a quantity of attacks over time.

Threat actors details 404 may include details about some of or all of the threat actors identified in the threat actors graph 402. For instance, for each threat actor included in the threat actors graph 402, the threat actors details 404 may include the number of attacks performed by that actor, e.g., during the predetermined period of time or at any time, an attack percentage for the respective actor, e.g., a ratio of the quantity of attacks associated with the respective actor to the quantity of attacks that have been carried out by all other threat actors, and the number of threat campaigns performed by the respective threat actor, e.g., during the predetermined period of time or at any time. In some examples, a sum of all the attack percentages may be greater than 100%, e.g., when multiple actors are involved in the same attack. In some examples, a sum of all the attack percentages, e.g., by attacker A, attacker B, and attacker C, may be 100%, e.g., when only a single attacker is associated with each attack. In some implementations, a sum of all the attack percentages may be less than 100%, e.g., when some attacks are not attributed to any attacker.

The user interface 400 may include additional information, such as a news feed 406 with information about security threats, potential security threats, solutions to security threats, or other relevant information. In some examples, the user interface 400 may include information about trends for particular types of threats, such as DDoS, particular types of threat campaigns, or other types of trend information determined using the data constructs.

Figure 5:
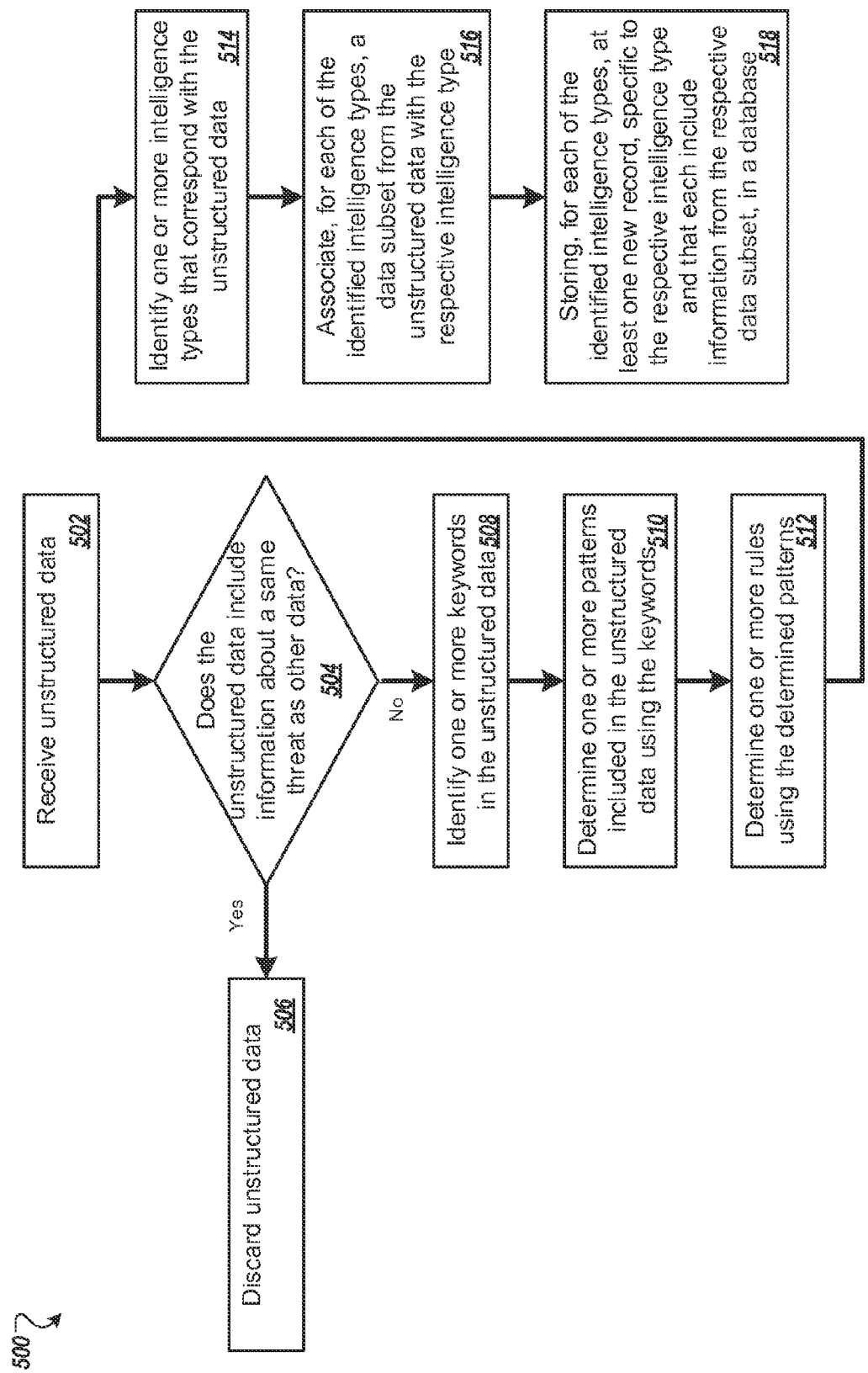
FIG. 5 is a flow diagram of a process for storing a record, created from unstructured data, in a database.

FIG. 5 is a flow diagram of a process 500 for storing a record, created from unstructured data, in a database. For example, the process 500 can be used by the analysis system 202 from the environment 200.

The process receives unstructured data (502). For instance, the analysis system retrieves the unstructured data from a website, e.g., that contains a security advisory or other security information.

The process determines whether the unstructured data includes information about a same threat as other data (504). For instance, the analysis system may determine whether a subset or all of the unstructured data is the same as other unstructured or structured data received by the analysis system.

If the process determines that the unstructured data includes information about the same threat as other data, the process discards the unstructured data (506). For example, the analysis system removes the unstructured data from memory, e.g., permanent or short term memory, and takes no further action with respect to the unstructured data.

If the process determines that the unstructured data does not include information about the same threat as other data, the process identifies one or more keywords in the unstructured data (508). For instance, the analysis system determines whether one or more of the keywords or key phrases, shown in Table 1, or variations of these keywords or key phrases, e.g., a different grammatical number or tense, are included in the unstructured data.

TABLE 1

Example Keywords and Key Phrases

| action | course | found | platform | statement |
|---|---|---|---|---|
| advisory | CVE ID | found in | prone | strategies |
| affect | CVSS | handling | prone to | systems |
| affected | denial of service | Header: Details | recommend | targets |
| affecting | described | Header: Summary | release | trigger |
| arbitrary | details | how to resolve | remediation | update |
| attacker | disable | impact | reported in | upgrade |
| attacks | discovered | improper | result | vendor |
| available | execute | information | result in | versions |
| cause | exploitation | mitigation | software | vulnerable |
| code | exploits | patch | solution | What can you do |

The process determines one or more patterns included in the unstructured data using the keywords (510). For example, the analysis system determines whether one or more combinations of keywords, shown in Tables 2 and 3, occur in the unstructured data or a particular subset, e.g., sentence, paragraph, page, etc., of the unstructured data. In the examples shown in Table 3, the values in brackets "<xxx>" can be a variety of different text strings. For instance, both "threat actor A exploits" and "group Z exploits" match the pattern "<TA> exploits."

TABLE 2

Examples Patterns A

| Patterns to identify vulnerabilities | Patterns to identify COAs | Patterns to identify IOCs |
|---|---|---|
| vulnerabilities described advisory affect versions | solution | impact |
| vendor statement | update available | vulnerabilities results |
| vendor information versions | recommended course action | vulnerabilities cause |
| vulnerability found | disable | vulnerability prone |
| prone vulnerability | mitigation strategies | attacker execute arbitrary code |
| systems affected | recommendations | exploitation vulnerabilities result |
| affected platform | patch vulnerable software | improper handling cause resulting |
| attacks targets | remediation | denial of service |
| vulnerable systems | upgrade patched release | |

TABLE 3

Examples Patterns B

| Patterns to identify Indicators of compromise (IOC) | Patterns to identify Threat Actors (TA) | Patterns to identify Exploit Target/ Vulnerabilities (ET) | Patterns to identify Adversary tactics, techniques, and procedures (TTP) | Patterns to identify Courses of Action (COA) |
|---|---|---|---|---|
| <IoC> Vulnerability | <TA> causes | Vulnerability <ET> | <IOC> reported in . . . <TTPs> | Solution |
| Cause <IoC> | <TA> exploits | CVE ID <ET> | Header: Summary <TTPs> | Update available |
| Prone to <IoC> | <TA> triggers | CVSS <ET> | Systems affected | Recommended course action |
| Result in <IoC> | | <IOC> resulting/found in/discovered/affecting <exploit target> | Affected platform | Disable |
| Trigger <IoC> | | Vulnerability found <ET> | Attacks targets | Mitigation strategies |
| | | Prone vulnerability | Vulnerable systems | Recommendations |
| | | Details <ET> | <attacker> <opt modal> <action verb> | Patch vulnerable software |
| | | | Header: Details <TTPs> | Remediation |
| | | | | Upgrade patched release |
| | | | | How to Resolve <COA> |
| | | | | What can you do <COA> |

The process determines one or more rules using the determined patterns (512). The analysis system may determine that each pattern corresponds with a rule identifying a particular intelligence type or types for the respective pattern. For instance, a rule may associate the pattern "vendor statement" with the intelligence type "vulnerabilities."

The process identifies one or more intelligence types that correspond with the unstructured data (514). The analysis system may determine that a particular subset of the unstructured data corresponds with one of the intelligence types, using the patterns or the rules, or that all of the unstructured data corresponds with a particular one or more of the intelligence types.

The process associates, for each of the identified intelligence types, a data subset from the unstructured data with the respective intelligence type (516). In some examples, the analysis system associates all of the unstructured data with the respective intelligence type. The association may include the creation of a data construct specific to the respective intelligence type that stores the information from the data subset.

The process stores, for each of the identified intelligence types, at least one new record, specific to the respective intelligence type and that each include information from the respective data subset, in a database (518). For example, the analysis system stores a data construct in a construct database for each of the identified intelligence types, e.g., and for each dataset or subset that corresponds to the identified intelligence type. The analysis system may store information about a particular subset of the unstructured data in multiple data constructs, e.g., when that particular subset corresponds with multiple different intelligence types.

The order of steps in the process 500 described above is illustrative only, and storing the record, created from the unstructured data, in the database can be performed in different orders. For example, the analysis system may associate the data subset with the respective intelligence type and then determine whether the data subset includes information about the same threat as other data or is otherwise related to the same threat as the other data.

In some implementations, the process 500 can include additional steps, fewer steps, or some of the steps can be divided into multiple steps. For example, the analysis system may perform the process 600 instead of steps 508 through 512. In some examples, the process does not include steps 506, 512, 518, or any two or more of these steps.

In some implementations, the process may determine rules for a third party, determine data constructs that correspond with those rules, and provide the data constructs to the third party, e.g., according to a priority. For instance, the process may determine one or more rules for a third party that each indicate that the third party should receive data associated with particular types of potential security threats and priority information for the data. The particular types of potential security threats may be specific to a particular software application, hardware device, or both. For example, a rule may indicate that data constructs for a particular operating system, for specific software for a particular operating system, or for particular software for a certain type of hardware, e.g., brand, model, or instruction set, should be sent to the third party.

The process may determine, for each of the potential security threats indicated in the rules, a group of the subsets that include information associated with the respective potential security threat. For instance, the analysis system uses the rules to determine which data constructs correspond with the rules for a particular third party, e.g., and have not already been sent to that particular third party. The analysis system may use a frequency of updates, specified by the rules, to determine when to send data constructs to the third party, e.g., and determine the data constructs that have been created or updated since the last time data constructs were sent to the particular third party.

The process may assign, for each subset in each of the groups, a priority to the respective subset using the priority information. For example, a priority module uses the priority information, which may directly or indirectly correspond with the potential security threats, to determine a priority for the data constructs, e.g., which data constructs are more likely to be of greater importance to the third party than the other data constructs. In some examples, each of the potential security threats in the rules may include corresponding priority information for the priority module to use when determining the priorities.

In some examples, the priority module determines priority information using machine learning. For instance, the priority module may determine that the third party requests additional information for certain types of potential security threats, and not others, and rank data constructs for those certain types of potential security threats with a higher priority than data constructs for the other types of potential security threats.

The process may provide the determined subsets to the third party using the respective priorities. For example, the analysis system provides each of the data constructs to a system of the third party, e.g., with each data construct in a separate message or with all of the data constructs in a message feed.

Figure 6:
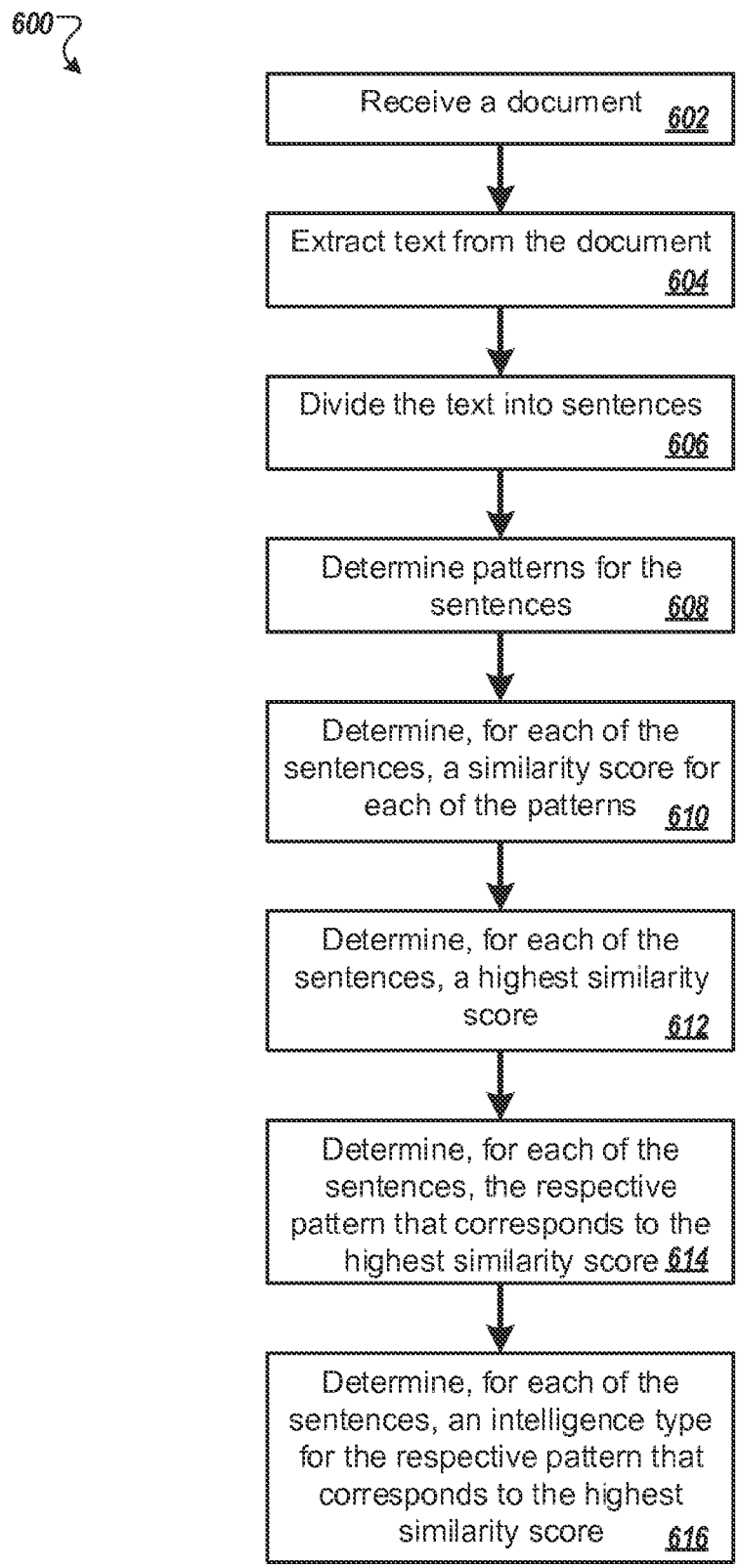
FIG. 6 is a flow diagram of a process for determining intelligence types for unstructured data in a document.

FIG. 6 is a flow diagram of a process 600 for determining intelligence types for unstructured data in a document. For example, the process 600 can be used by the analysis system 202 from the environment 200.

The process receives a document (602). For instance, the analysis system receives the document from an unstructured data source, e.g., a webpage hosted on behalf of a particular organization, and stores the document in a memory. The parser may retrieve the document from the memory.

The process extracts text from the document (604). For example, the parser identifies the text in the document, e.g., separate from images and other content included in the document.

The process divides the text into sentences (606). For instance, the parser determines the logical segments in the text, such as words, sentences, and paragraphs.

The process determines patterns for the sentences (608). For example, using the example patterns in Tables 2 and 3 above, the parser determines whether any of the sentences include a pattern or text associated with a pattern, e.g., synonyms for words included in a pattern.

The process determines, for each of the sentences, a similarity score for each of the patterns (610). For instance, the parser determines that a first similarity score for a particular sentence, e.g., "The vulnerabilities described in this advisory affect Application A versions 0.9.6j and 0.9.6k," and a particular pattern, e.g., "mitigation strategies," is low, e.g., zero, and a second similarity score for another pattern, e.g., "vulnerabilities described advisory affect versions" is high, e.g., one. The parser may determine other similarity scores for the particular sentence for different patterns, e.g., "affected platform" or "vulnerable systems," that are between the first similarity score and the second similarity score.

The parser, or another system, may use any appropriate method to determine the similarity scores. For instance, a similarity score may represent the percentage of words included in a pattern that are also in the sentence or logical segment, e.g., as a value between zero and one. The similarity score may represent the percentage of words included in a pattern that are included in the sentence or have synonyms included in the sentence. In some examples, the parser may use pointwise mutual information (PMI) to determine the similarity scores.

The process determines, for each of the sentences, a highest similarity score (612). For example, the parser determines that the second similarity score for the particular sentence is the highest similarity score for that sentence.

The process determines, for each of the sentences, the respective pattern that corresponds to the highest similarity score (614). For instance, the parser determines that the respective pattern for the particular sentence is "vulnerabilities described advisory affect versions."

The process determines, for each of the sentences, an intelligence type for the respective pattern that corresponds to the highest similarity score (616). For example, the parser determines that the particular sentence corresponds with a vulnerability using the determined pattern. The parser may make the determination using a rule or other information that correlate the respective pattern with the intelligence type.

The parser may then create a data construct, e.g., specific to vulnerabilities, for the particular sentence. The data construct may include information representing the sentence "The vulnerabilities described in this advisory affect Application A versions 0.9.6j and 0.9.6k" and additional information, such as the source of the unstructured data, a timestamp when the unstructured data was created or received, a source reputation, a severity, a severity reputation, or any two or more of these.

Table 4 below shows some additional examples of sentences and corresponding patterns. In some examples, a sentence may be associated with a particular intelligence type based on a relationship between the sentence and another sentence, e.g., the sentence may be selected on the basis of recommendation by maximum number patterns. For instance, the parser may determine that a first sentence, "The impact from vulnerabilities can expose a Denial-of-Service (DoS) condition," in a particular document or paragraph is an indicator of compromise, using the pattern "denial of service." The parser may then determine that a second sentence, "The vulnerabilities described in this advisory affect Application B versions 4.0 and current," in the same particular document or paragraph, e.g., adjacent to the first sentence, should also be an indicator of compromise based on a relationship between the two sentences, e.g., when both sentences relate to the same vulnerability.

Table 4 shows an example of a sentence, "The vulnerabilities described in this advisory affect Application B versions 4.0 and current," which may be associated with multiple intelligence types, e.g., both vulnerability and indicator of compromise. In this example, the parser creates two constructs, one for a vulnerability and one for an indicator of compromise, that both include information about the sentence, e.g., ASCII code representing the text in the sentence.

TABLE 4

Example mapping of sentences to patterns and Intelligence Types

| Sentence | Pattern | Intelligence Type |
|---|---|---|
| The vulnerabilities described in this advisory affect Application B versions 4.0 and current. | vulnerabilities described advisory affect versions | Vulnerability |
| | Sentence selected on the basis of recommendation by maximum number patterns | Indicator of Compromise (IOC) |
| Vendor Information Application C version 3.0 and earlier Application C version 3.2.11 and earlier Application C 2.x series is not vulnerable. | vendor information versions | Vulnerability |
| There are no known workarounds for the vulnerabilities. | Sentence selected on the basis of recommendation by maximum number patterns | Vulnerability |
| The impact from vulnerabilities can expose a Denial-of-Service (DoS) condition. | denial of service | Indicator of Compromise (IOC) |
| An attacker can exploit this issue to cause the process Z to hang, denying service to legitimate users. | denial of service | Indicator of Compromise (IOC) |
| Impact Recursive nameservers are vulnerable to this defect. | impact | Indicator of Compromise (IOC) |
| Remediation Patch the affected software with the patches supplied by the vendor or update to version 0.9.6j. | remediation | Course of Action (COA) |
| Disable the Workstation Service Depending on site requirements, you may wish to disable the Workstation Service as described in document M. | disable | Course of Action (COA) |
| Mitigating Strategies: Block external access at the network boundary, as much as possible. | mitigation strategies | Course of Action (COA) |

In some implementations, the process 600 can include additional steps, fewer steps, or some of the steps can be divided into multiple steps. For example, the process might not receive a document. In some examples, the parser receives unstructured data from the unstructured data sources.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 7:
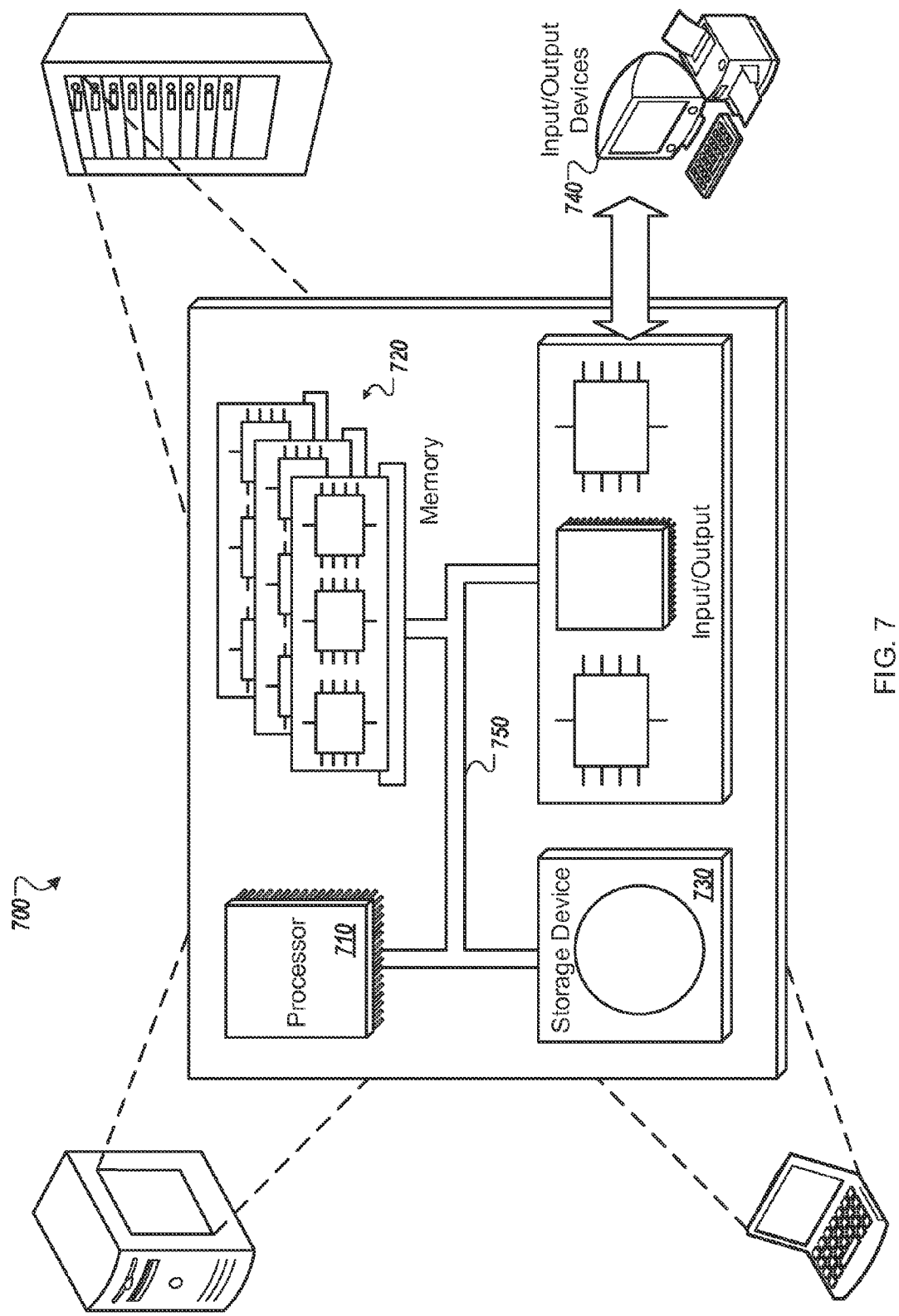
FIG. 7 is a block diagram of a computing system that can be used in connection with computer-implemented methods described in this document.

An example of one such type of computer is shown in FIG. 7, which shows a schematic diagram of a generic computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving, by an analysis system that includes one or more computers, a plurality of unstructured textual datasets that each include information about a respective potential security threat;
   determining that a first subset of the plurality of unstructured textual datasets and a second, different subset of the plurality of unstructured textual datasets both comprise information about a particular threat, the second, different subset being a different subset than the first subset;
   discarding the first subset in response to determining that the first subset of the plurality of unstructured textual datasets and the second, different subset of the plurality of unstructured textual datasets both comprise information about the particular threat;
   for each respective subset in the plurality of unstructured textual datasets that has not been discarded:
      identifying, by the analysis system, one or more keywords in the respective subset;
      determining, by the analysis system, one or more patterns included in the respective subset using the identified one or more keywords;
      identifying, by the analysis system, one or more intelligence types that correspond with the respective subset using the one or more patterns; and
      associating, by the analysis system for each respective intelligence type of the identified one or more intelligence types, the respective subset from the plurality of unstructured textual datasets with the respective intelligence type;
   determining a rule for a third party that indicates that the third party should receive data associated with a particular intelligence type of the one or more intelligence types;
   determining that the second subset of the plurality of unstructured textual datasets is associated with the particular intelligence type; and
   providing the second subset of the plurality of unstructured textual datasets that is associated with the particular intelligence type to the third party.

2. The method of claim 1, wherein associating, for each respective intelligence type of the identified one or more intelligence types, the respective subset from the plurality of unstructured textual datasets with the respective intelligence type comprises storing, for each respective intelligence type of the identified one or more intelligence types, at least one new record, in a database, specific to the respective intelligence type that each comprises information from the respective subset.

3. The method of claim 1, wherein:
   receiving the plurality of unstructured textual datasets comprises receiving a security advisory that identifies at least one of a particular hardware device or a particular software application;
   determining that the first subset of the plurality of unstructured textual datasets and the second, different subset of the plurality of unstructured textual datasets both comprise information about the particular threat comprises determining that the first subset and the second, different subset both comprise information about the particular hardware device or the particular software application; and
   providing the second subset of the plurality of unstructured textual datasets that is associated with the particular intelligence type to the third party comprises providing, to the third party, the second subset that comprises information about the particular hardware device or the particular software application.

4. The method of claim 1, wherein receiving the plurality of unstructured textual datasets comprises receiving at least some of the plurality of unstructured textual datasets from a government source or a security source.

5. The method of claim 1, wherein identifying the one or more intelligence types that correspond with the respective subset using the one or more patterns comprises:
   determining one or more rules using the one or more patterns; and
   identifying the one or more intelligence types that correspond with the respective subset using the one or more rules.

6. The method of claim 1, wherein providing the second subset of the plurality of unstructured textual datasets that is associated with the particular intelligence type to the third party is responsive to determining the rule for the third party that indicates that the third party should receive data associated with the particular intelligence type of the one or more intelligence types and determining that the second subset of the plurality of unstructured textual datasets is associated with the particular intelligence type.

7. The method of claim 6, wherein providing the second subset of the plurality of unstructured textual datasets that is associated with the particular intelligence type to the third party comprises providing instructions to the third party for presentation of information included in the second subset.

8. A system comprising:
   one or more computers and one or more storage devices storing instructions that are operable, when executed by the one or more computers, to cause the one or more computers to perform operations comprising:
      receiving a plurality of unstructured textual datasets that each include information about a respective potential security threat;
      determining that a first subset of the plurality of unstructured textual datasets and a second, different subset of the plurality of unstructured textual datasets both comprise information about a particular threat, the second, different subset being a different subset than the first subset;
      discarding the first subset in response to determining that the first subset of the plurality of unstructured textual datasets and the second, different subset of the plurality of unstructured textual datasets both comprise information about the particular threat;
for each respective subset in the plurality of unstructured textual datasets that has not been discarded:
identifying one or more keywords in the respective subset;
determining one or more patterns included in the respective subset using the identified one or more keywords; and
identifying one or more intelligence types that correspond with the respective subset using the one or more patterns; and
associating, for each respective intelligence type of the identified one or more intelligence types, the respective subset from the plurality of unstructured textual datasets with the respective intelligence type;
determining a rule for a third party that indicates that the third party should receive data associated with a particular intelligence type of the one or more intelligence types;
determining that the second subset of the plurality of unstructured textual datasets is associated with the particular intelligence type; and
providing the second subset of the plurality of unstructured textual datasets that is associated with the particular intelligence type to the third party.

9. The system of claim 8, wherein associating, for each respective intelligence type of the identified one or more intelligence types, the respective subset from the plurality of unstructured textual datasets with the respective intelligence type comprises storing, for respective intelligence type of the identified one or more intelligence types, at least one new record, in a database, specific to the respective intelligence type that each comprises information from the respective subset.

10. The system of claim 8, wherein providing the second subset of the plurality of unstructured textual datasets that is associated with the particular intelligence type to the third party is responsive to determining the rule for the third party that indicates that the third party should receive data associated with the particular intelligence type of the one or more intelligence types and determining that the second subset of the plurality of unstructured textual datasets is associated with the particular intelligence type.

11. The system of claim 10, wherein providing the second subset of the plurality of unstructured textual datasets that is associated with the particular intelligence type to the third party comprises providing instructions to the third party for presentation of information included in the second subset.

12. The system of claim 8, wherein:
receiving the plurality of unstructured textual datasets comprises receiving a security advisory that identifies at least one of a particular hardware device or a particular software application;
determining that the first subset of the plurality of unstructured textual datasets and the second, different subset of the plurality of unstructured textual datasets both comprise information about the particular threat comprises determining that the first subset and the second, different subset both comprise information about the particular hardware device or the particular software application; and
providing the second subset of the plurality of unstructured textual datasets that is associated with the particular intelligence type to the third party comprises providing, to the third party, the second subset that comprises information about the particular hardware device or the particular software application.

13. The system of claim 8, wherein receiving the plurality of unstructured textual datasets comprises receiving at least some of the plurality of unstructured textual datasets from a government source or a security source.

14. The system of claim 8, wherein identifying the one or more intelligence types that correspond with the respective subset using the one or more patterns comprises:
determining one or more rules using the one or more patterns; and
identifying the one or more intelligence types that correspond with the respective subset using the one or more rules.

15. A computer storage medium encoded with instructions that, when executed by a user device, cause the user device to perform operations comprising:
receiving a plurality of unstructured textual datasets that each include information about a respective potential security threat;
determining that a first subset of the plurality of unstructured textual datasets and a second, different subset of the plurality of unstructured textual datasets both comprise information about a particular threat, the second, different subset being a different subset than the first subset;
discarding the first subset in response to determining that the first subset of the plurality of unstructured textual datasets and the second, different subset of the plurality of unstructured textual datasets both comprise information about the particular threat;
for each respective subset in the plurality of unstructured textual datasets that has not been discarded:
identifying one or more keywords in the respective subset;
determining one or more patterns included in the respective subset using the identified one or more keywords;
identifying one or more intelligence types that correspond with the respective subset using the one or more patterns; and
associating, for each respective intelligence type of the identified one or more intelligence types, the respective subset from the plurality of unstructured textual datasets with the respective intelligence type;
determining a rule for a third party that indicates that the third party should receive data associated with a particular intelligence type of the one or more intelligence types;
determining that the second subset of the plurality of unstructured textual datasets is associated with the particular intelligence type; and
providing the second subset of the plurality of unstructured textual datasets that is associated with the particular intelligence type to the third party.

16. The computer storage medium of claim 15, wherein associating, for each respective intelligence type of the identified one or more intelligence types, the respective subset from the unstructured textual datasets with the respective intelligence type comprises storing, for each respective intelligence type of the identified one or more intelligence types, at least one new record, in a database, specific to the respective intelligence type that each comprises information from the respective subset.

17. The computer storage medium of claim 15, wherein:

receiving the plurality of unstructured textual datasets comprises receiving a security advisory that identifies at least one of a particular hardware device or a particular software application;

determining that the first subset of the plurality of unstructured textual datasets and the second, different subset of the plurality of unstructured textual datasets both comprise information about the particular threat comprises determining that the first subset and the second, different subset both comprise information about the particular hardware device or the particular software application; and providing the second subset of the plurality of unstructured textual datasets that is associated with the particular intelligence type to the third party comprises providing, to the third party, the second subset that comprises information about the particular hardware device or the particular software application.

18. The computer storage medium of claim 15, wherein receiving the plurality of unstructured textual datasets comprises receiving at least some of the plurality of unstructured textual datasets from a government source or a security source.

19. The computer storage medium of claim 15, wherein identifying the one or more intelligence types that correspond with the respective subset using the one or more patterns comprises:

determining one or more rules using the one or more patterns; and identifying the one or more intelligence types that correspond with the respective subset using the one or more rules.

20. The computer storage medium of claim 15, wherein providing the second subset of the plurality of unstructured textual datasets that is associated with the particular intelligence type to the third party is responsive to determining the rule for the third party that indicates that the third party should receive data associated with the particular intelligence type of the one or more intelligence types and determining that the second subset of the plurality of unstructured textual datasets is associated with the particular intelligence type.

21. The computer storage medium of claim 20, wherein providing providing the second subset of the plurality of unstructured textual datasets that is associated with the particular intelligence type to the third party comprises providing instructions to the third party for presentation of information included in the second subset.

* * * * *

UNITED STATES PATENT AND TRADEMARK OFFICE
CERTIFICATE OF CORRECTION

PATENT NO. : 9,716,721 B2
APPLICATION NO. : 14/473743
DATED : July 25, 2017
INVENTOR(S) : Elvis Hovor et al.

It is certified that error appears in the above-identified patent and that said Letters Patent is hereby corrected as shown below:

In the Claims

In Claim 21, Column 34, Line 20, delete "providing providing" and insert -- providing --, therefor Signed and Sealed this
Twelfth Day of September, 2017

Joseph Matal
*Performing the Functions and Duties of the*
*Under Secretary of Commerce for Intellectual Property and*
*Director of the United States Patent and Trademark Office*